(12) United States Patent
Hayakawa et al.

(10) Patent No.: US 11,433,759 B2
(45) Date of Patent: Sep. 6, 2022

(54) GRILLE SHUTTER ATTACHING STRUCTURE

(71) Applicant: Toyota Jidosha Kabushiki Kaisha, Toyota (JP)

(72) Inventors: Tomoya Hayakawa, Nagoya (JP); Takaharu Nagatoshi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 16/855,066

(22) Filed: Apr. 22, 2020

(65) Prior Publication Data

US 2021/0031617 A1  Feb. 4, 2021

(30) Foreign Application Priority Data

Jul. 29, 2019 (JP) .............................. JP2019-138520

(51) Int. Cl.
*B60K 11/00* (2006.01)
*B60K 11/08* (2006.01)
*B60K 11/04* (2006.01)

(52) U.S. Cl.
CPC ............ *B60K 11/085* (2013.01); *B60K 11/04* (2013.01)

(58) Field of Classification Search
CPC .............................. B60K 11/085; B60K 11/04
USPC ....................................................... 180/68.1
See application file for complete search history.

(56) References Cited

U.S. PATENT DOCUMENTS

| | | | |
|---|---|---|---|
| 8,646,522 B1* | 2/2014 | Orgeron | B25B 5/147 166/85.1 |
| 8,752,886 B2* | 6/2014 | Wirth | B60K 11/085 296/193.09 |
| 9,644,525 B2* | 5/2017 | Bignon | F01P 7/02 |
| 10,155,438 B2* | 12/2018 | Vacca | B60K 11/08 |
| 10,323,852 B2* | 6/2019 | Takanaga | B60K 11/085 |
| 2009/0050385 A1* | 2/2009 | Guilfoyle | B60R 19/48 180/68.1 |
| 2010/0243352 A1* | 9/2010 | Watanabe | B60K 11/085 180/68.1 |
| 2010/0282533 A1* | 11/2010 | Sugiyama | B60K 11/085 180/68.1 |
| 2011/0005851 A1* | 1/2011 | Doroghazi | B60K 11/085 180/68.1 |
| 2014/0291056 A1* | 10/2014 | Takanaga | B60K 11/085 180/274 |
| 2017/0050509 A1* | 2/2017 | Aizawa | B60R 19/52 |
| 2018/0361847 A1* | 12/2018 | Vacca | B60K 11/085 |

(Continued)

FOREIGN PATENT DOCUMENTS

JP  2016-097890 A  5/2016
JP  2018-079830 A  5/2018

*Primary Examiner* — Hau V Phan
(74) *Attorney, Agent, or Firm* — Dinsmore & Shohl LLP

(57) ABSTRACT

A grille shutter is fixed to a radiator grille at end portions of the grille shutter in the vehicle right-left direction. A restriction mechanism includes a restriction member provided to the radiator grille and a restriction member abutting portion provided to an intermediate portion of the grille shutter in the vehicle right-left direction. The restriction mechanism restricts the intermediate portion of the grille shutter from moving toward the vehicle rear side relative to the radiator grille. The restriction member is configured to be movable toward the vehicle rear side relative to the restriction member abutting portion.

9 Claims, 24 Drawing Sheets

(56) References Cited

U.S. PATENT DOCUMENTS

2019/0143806 A1\* 5/2019 Vacca .................... B60K 11/08
180/68.1

\* cited by examiner

GRILLE SHUTTER ATTACHING STRUCTURE

CROSS-REFERENCE TO RELATED APPLICATIONS

This application claims priority to Japanese Patent Application No. 2019-138520 filed on Jul. 29, 2019, which is incorporated herein by reference in its entirety including the specification, drawings and abstract.

BACKGROUND

1. Technical Field

The disclosure relates to a structure of attaching a grille shutter to a radiator grille.

2. Description of Related Art

Japanese Unexamined Patent Application Publication No. 2018-079830 (JP 2018-079830 A) discloses a technique such that in a vehicle in which a cab including a radiator grille (front grille) is supported by a vehicle body frame via a cab mount, a grille shutter disposed behind the radiator grille in the vehicle front-rear direction is fixed to the radiator grille (the cab), i.e. not to the vehicle body frame.

However, the technique disclosed in JP 2018-079830 A has the following problems. Since the grille shutter is fixed to the radiator grille, there is a possibility that when a collision load is applied to the radiator grille from the vehicle front side, such as at the time of a frontal crash test of the vehicle, deformation of the radiator grille toward the vehicle rear side is suppressed by the grille shutter. On the other hand, when the fixation of the grille shutter to the radiator grille is insufficient, there is a possibility that at the normal time when a collision load is not applied to the radiator grille from the vehicle front side, the grille shutter is deformed due to a wind pressure when the vehicle is traveling.

SUMMARY

It is an object of the disclosure to provide a grille shutter attaching structure, in which a grille shutter is fixedly attached to a radiator grille, that can suppress deformation of the grille shutter at the normal time when a collision load is not applied to the radiator grille, and that can allow the radiator grille to be easily deformed at the time of application of a collision load to the radiator grille.

The disclosure that achieves the above object is as follows. (1) [First to Tenth Embodiments] A grille shutter attaching structure includes a radiator grille, a grille shutter, and a restriction mechanism. The grille shutter is disposed behind the radiator grille in a vehicle front-rear direction and fixedly attached to the radiator grille at end portions of the grille shutter in a vehicle right-left direction. The restriction mechanism includes a restriction member provided to the radiator grille and a restriction member abutting portion provided to an intermediate portion of the grille shutter in the vehicle right-left direction and configured to be abuttable against the restriction member from a vehicle front side. The restriction mechanism is configured to restrict the intermediate portion of the grille shutter in the vehicle right-left direction from moving toward a vehicle rear side relative to the radiator grille. The restriction member is configured to be movable toward the vehicle rear side relative to the restriction member abutting portion. (2) [First to Tenth Embodiments] In the grille shutter attaching structure according to (1), the restriction mechanism may be configured such that at a normal time when a collision load is not applied to the radiator grille from the vehicle front side, the restriction member abutting portion comes in contact with the restriction member to restrict the intermediate portion of the grille shutter in the vehicle right-left direction from moving toward the vehicle rear side relative to the radiator grille, and that when the collision load is applied to the radiator grille from the vehicle front side to deform the radiator grille toward the vehicle rear side, the restriction member is moved toward the vehicle rear side relative to the restriction member abutting portion. (3) [First to Tenth Embodiments] In the grille shutter attaching structure according to (1) or (2), the radiator grille may have a convex curved shape being convex toward the vehicle front side when viewed from a vehicle up-down direction, and may include a grille frontmost portion located most on the vehicle front side, a grille right portion located more on a vehicle right side than the grille frontmost portion, and a grille left portion located more on a vehicle left side than the grille frontmost portion. The end portion of the grille shutter on the vehicle right side may be located behind the grille right portion in the vehicle front-rear direction and fixedly attached to the grille right portion, and the end portion of the grille shutter on the vehicle left side may be located behind the grille left portion in the vehicle front-rear direction and fixedly attached to the grille left portion. (4) [First to Tenth Embodiments] In the grille shutter attaching structure according to any one of (1) to (3), the restriction member may include an arm portion extending from the radiator grille toward the vehicle rear side, and a stopper portion provided to an extending direction leading end portion of the arm portion and extending to behind the restriction member abutting portion in the vehicle front-rear direction. (5) [First to Tenth Embodiments] In the grille shutter attaching structure according to any one of (1) to (4), the restriction member abutting portion may be provided to the intermediate portion of the grille shutter in the vehicle right-left direction at each of an upper portion and a lower portion of the grille shutter. (6) [First to Tenth Embodiments] In the grille shutter attaching structure according to any one of (1) to (5), a space portion may be provided to the radiator grille and/or the restriction member at a part located forward of the restriction member abutting portion in the vehicle front-rear direction, the space portion configured to suppress an interference with the restriction member abutting portion in the vehicle front-rear direction when the restriction member is moved toward the vehicle rear side relative to the restriction member abutting portion. (7) [Sixth to Tenth Embodiments] In the grille shutter attaching structure according to any one of (1) to (6), the restriction mechanism may further include a vibration suppressing portion, and the vibration suppressing portion may be configured to, at a normal time when a collision load is not applied to the radiator grille from the vehicle front side, suppress relative vibration between the restriction member and the restriction member abutting portion in the vehicle front-rear direction by cooperating with one of the restriction member and the restriction member abutting portion to sandwich the other one of the restriction member and the restriction member abutting portion in the vehicle front-rear direction. (8) [Sixth to Eighth Embodiments] In the grille shutter attaching structure according to (7), when the restriction member is moved toward the vehicle rear side relative to the restriction member abutting portion, the restriction member and/or the restriction member abutting portion may be configured to be elastically deformed in a direction perpendicular to the vehicle front-rear direction to allow the other one of the restriction member and the restriction member abutting portion to get over the vibration suppressing portion. (9) [Ninth and Tenth Embodiments] In the grille shutter attaching structure according to (7), when the restriction member is moved toward the vehicle rear side relative to the restriction member abutting portion, the vibration suppressing portion may be configured to be pushed by the other one of the restriction member and the restriction member abutting portion to be plastically deformed.

With the grille shutter attaching structure according to any one of (1) to (9), the following effects can be obtained. Since the grille shutter is fixedly attached to the radiator grille at the end portions in the vehicle right-left direction, when the grille shutter receives the wind pressure during the travel of the vehicle from the vehicle front side at the normal time when the collision load is not applied to the radiator grille from the vehicle front side, the intermediate portion of the grille shutter in the vehicle right-left direction attempts to deform (bend) toward the vehicle rear side. However, since the restriction mechanism is provided that restricts the intermediate portion of the grille shutter in the vehicle right-left direction from moving toward the vehicle rear side relative to the radiator grille, the movement of the grille shutter toward the vehicle rear side can be restricted by the restriction mechanism. Consequently, it is possible to suppress the deformation of the grille shutter at the normal time.

On the other hand, when the collision load is applied to the radiator grille from the vehicle front side, the radiator grille is deformed toward the vehicle rear side. In this event, since the restriction member is configured to be movable toward the vehicle rear side relative to the restriction member abutting portion, the restriction member is moved along with the radiator grille toward the vehicle rear side due to the deformation of the radiator grille toward the vehicle rear side without being impeded by the restriction member abutting portion. Therefore, it is possible to suppress that the restriction mechanism impedes the deformation of the radiator grille. Consequently, the radiator grille can be easily deformed toward the vehicle rear side.

With the grille shutter attaching structure according to (3), the following effects can be obtained. Since the end portion of the grille shutter on the vehicle right side is fixedly attached to the grille right portion and the end portion of the grille shutter on the vehicle left side is fixedly attached to the grille left portion, even when the grille shutter is attached to the radiator grille, the grille frontmost portion can be moved toward the vehicle rear side without being impeded by the grille shutter. Therefore, it is advantageous in ensuring the deformable amount of the radiator grille toward the vehicle rear side without being impeded by the grille shutter.

With the grille shutter attaching structure according to (4), the following effects can be obtained. Since the restriction member has the arm portion extending from the radiator grille toward the vehicle rear side and the stopper portion provided to the extending direction leading end portion of the arm portion and extending to behind the restriction member abutting portion in the vehicle front-rear direction, when the grille shutter receives the wind pressure during the travel of the vehicle from the vehicle front side at the normal time, the restriction member abutting portion comes in contact with the stopper portion of the restriction member from the vehicle front side so that it is possible to restrict the intermediate portion of the grille shutter in the vehicle right-left direction from moving toward the vehicle rear side.

With the grille shutter attaching structure according to (5), the following effects can be obtained. Since the restriction member abutting portion is provided to each of the upper portion and the lower portion of the grille shutter, the movement of the grille shutter toward the vehicle rear side can be restricted on both upper and lower sides. Therefore, the movement of the grille shutter toward the vehicle rear side can be efficiently restricted.

With the grille shutter attaching structure according to (6), the following effects can be obtained. Since the space portion for suppressing the interference with the restriction member abutting portion in the vehicle front-rear direction when the restriction member is moved toward the vehicle rear side relative to the restriction member abutting portion is provided to the radiator grille and/or the restriction member at a part located forward of the restriction member abutting portion in the vehicle front-rear direction, it is possible to suppress that the restriction member abutting portion comes in contact with the radiator grille and/or the restriction member to impede the movement of the restriction member toward the vehicle rear side relative to the restriction member abutting portion.

With the grille shutter attaching structure according to (7), the following effects can be obtained. The restriction mechanism includes the vibration suppressing portion, and at the normal time when the collision load is not applied to the radiator grille from the vehicle front side, the vibration suppressing portion cooperates with one of the restriction member and the restriction member abutting portion to sandwich the other one of the restriction member and the restriction member abutting portion therebetween in the vehicle front-rear direction, thereby suppressing the relative vibration between the restriction member and the restriction member abutting portion in the vehicle front-rear direction, and therefore, compared to the case where the vibration suppressing portion is not provided, it is possible to suppress the relative vibration between the restriction member and the restriction member abutting portion in the vehicle front-rear direction at the normal time.

With the grille shutter attaching structure according to (8), the following effects can be obtained. When the restriction member is moved toward the vehicle rear side relative to the restriction member abutting portion, the restriction member and/or the restriction member abutting portion is elastically deformed in the direction perpendicular to the vehicle front-rear direction so that the other one of the restriction member and the restriction member abutting portion can get over the vibration suppressing portion. Therefore, even when the vibration suppressing portion is provided, the restriction member can be moved toward the vehicle rear side relative to the restriction member abutting portion.

With the grille shutter attaching structure according to (9), the following effects can be obtained. When the restriction member is moved toward the vehicle rear side relative to the restriction member abutting portion, the vibration suppressing portion is pushed by the other one of the restriction member and the restriction member abutting portion to be plastically deformed. Therefore, even when the vibration suppressing portion is provided, the restriction member can be moved toward the vehicle rear side relative to the restriction member abutting portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
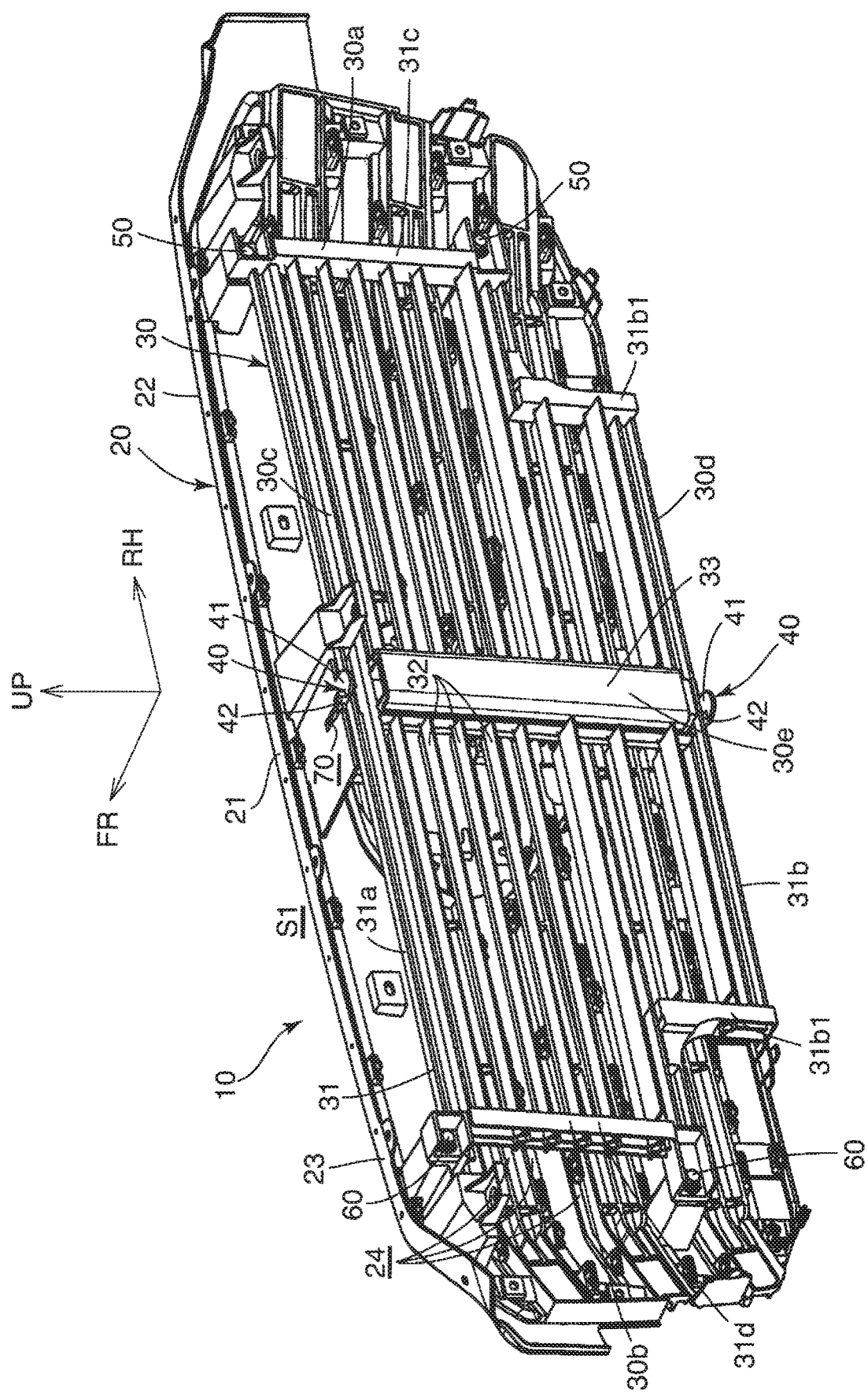
FIG. 1 is a perspective view of a grille shutter attaching structure of a first embodiment of the disclosure as viewed from obliquely rearward and upward of a vehicle.

Referring to the drawings, grille shutter attaching structures of embodiments of the disclosure will be described below. In the figures, FR represents the front side in the vehicle front-rear direction (the front-rear direction), UP represents the upper side in the vehicle up-down direction (the up-down direction), and RH represents the right side in the vehicle right-left direction (the right-left direction).

Figure 7:
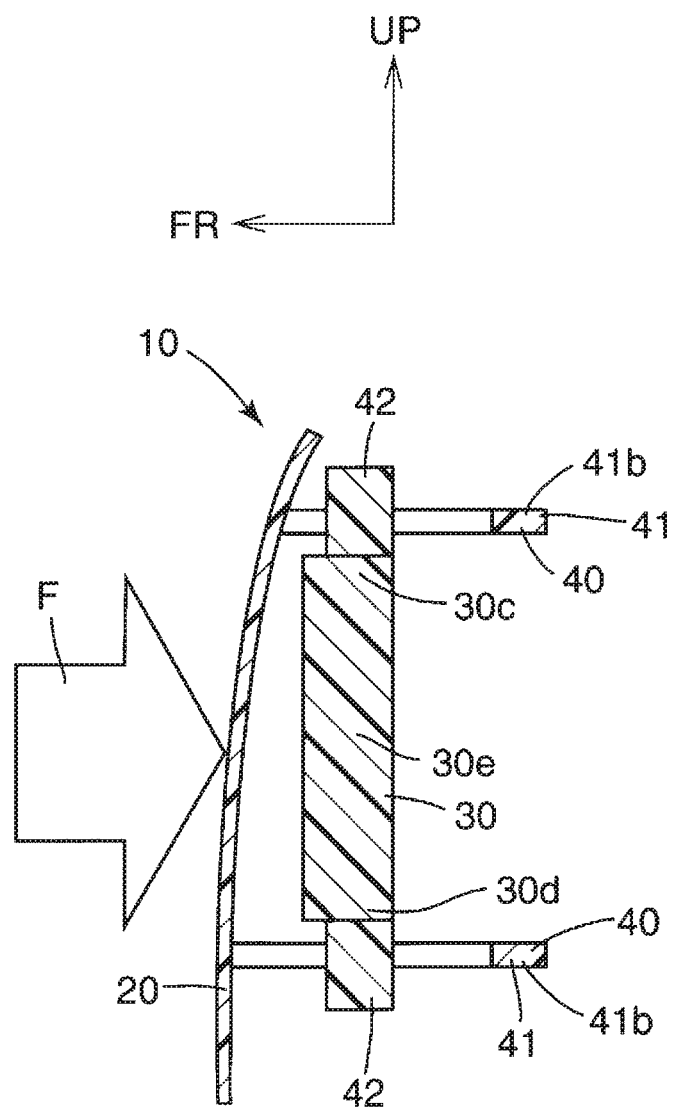
FIG. 7 is a schematic sectional view taken along the line B-B in FIG. 6.
Figure 8:
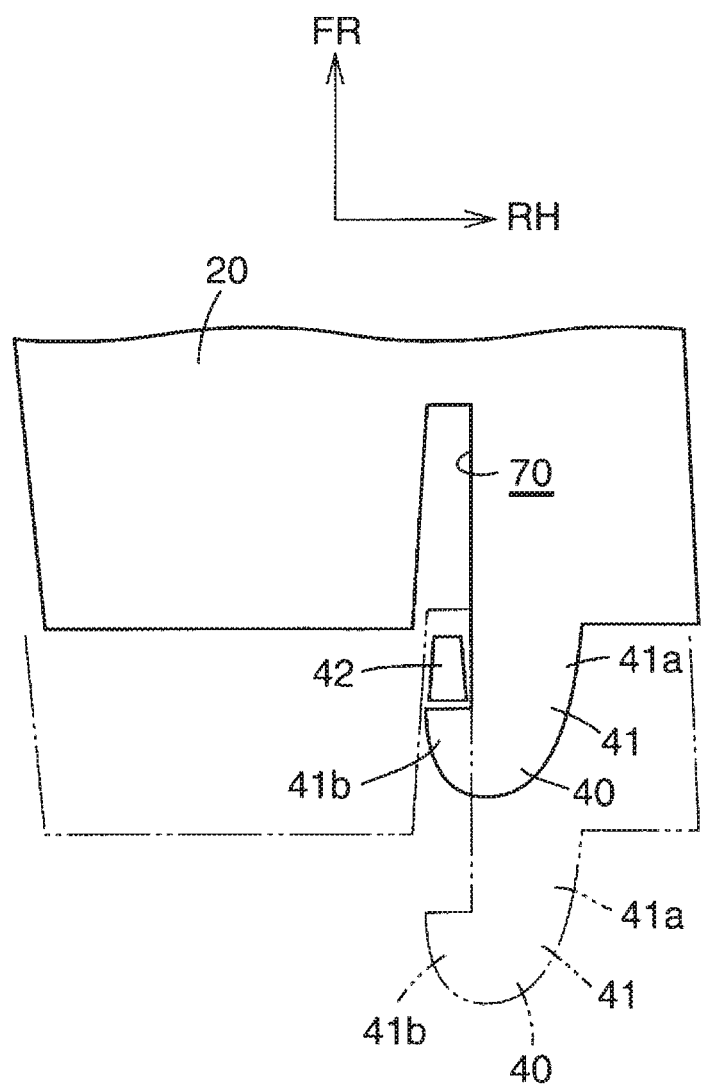
FIG. 8 is a partial schematic plan view of the grille shutter attaching structure of the first embodiment of the disclosure when a radiator and/or a restriction member is provided with a space.
Figure 9:
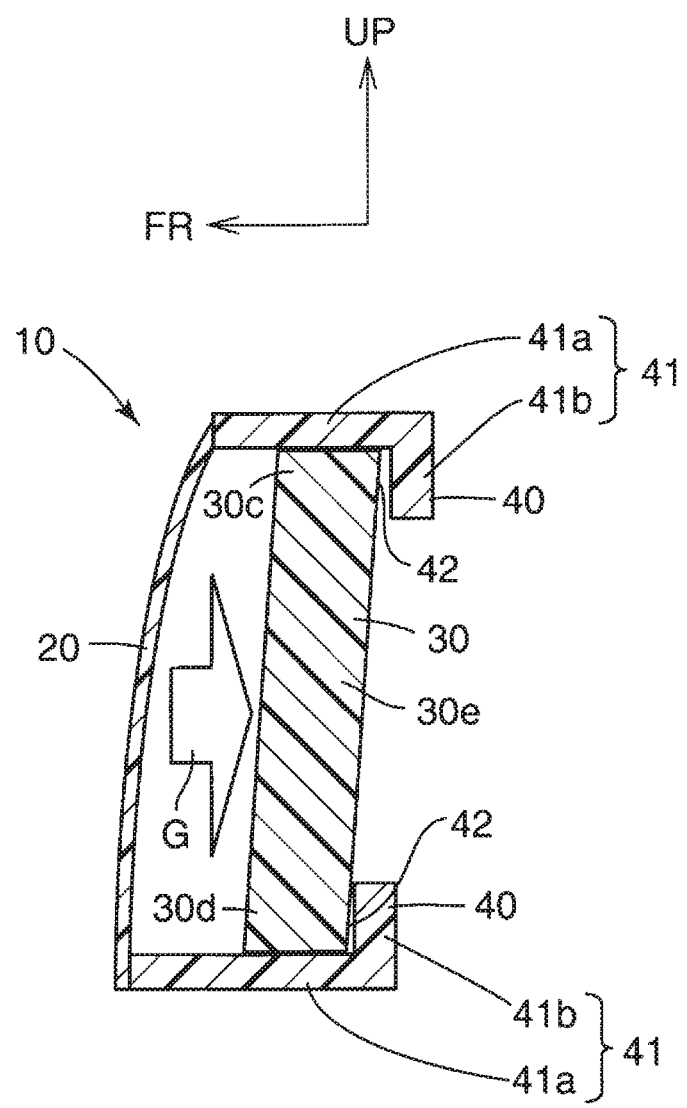
FIG. 9 is a schematic sectional view of a grille shutter attaching structure of a second embodiment of the disclosure when a wind pressure during the travel of the vehicle is applied to a grille shutter from the vehicle front side at the normal time.
Figure 10:
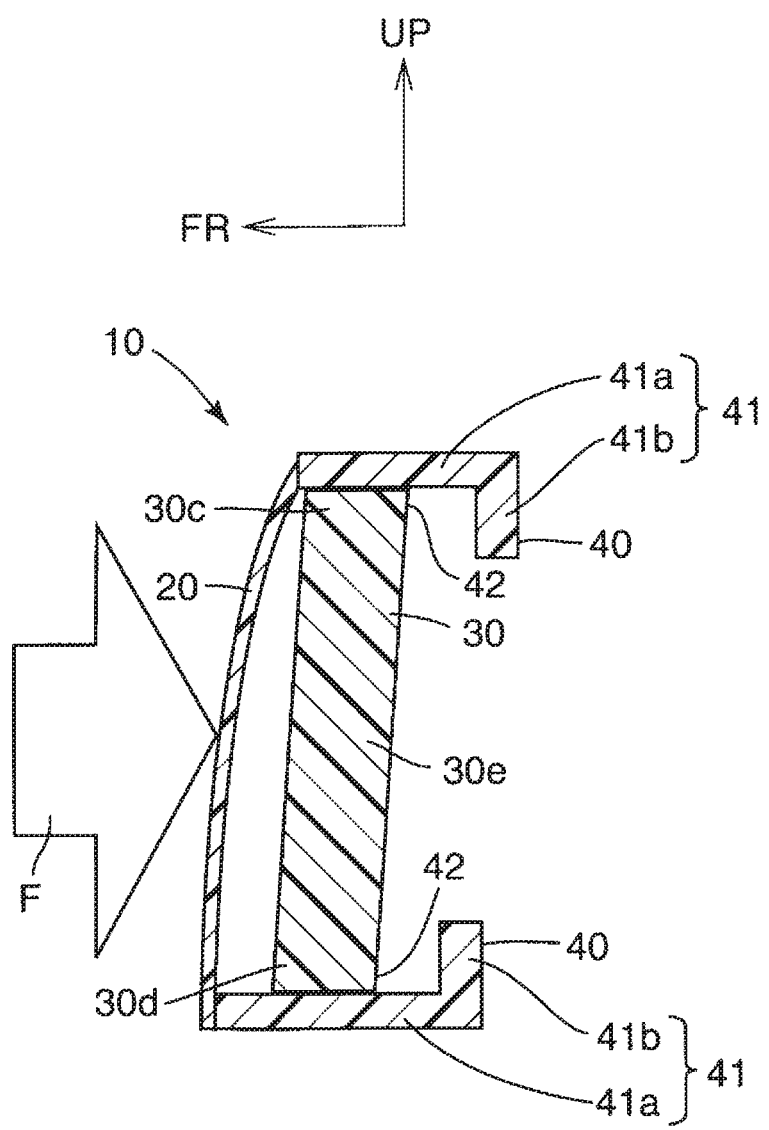
FIG. 10 is a schematic sectional view of the grille shutter attaching structure of the second embodiment of the disclosure when a collision load is applied to a radiator grille from the vehicle front side.
Figure 11:
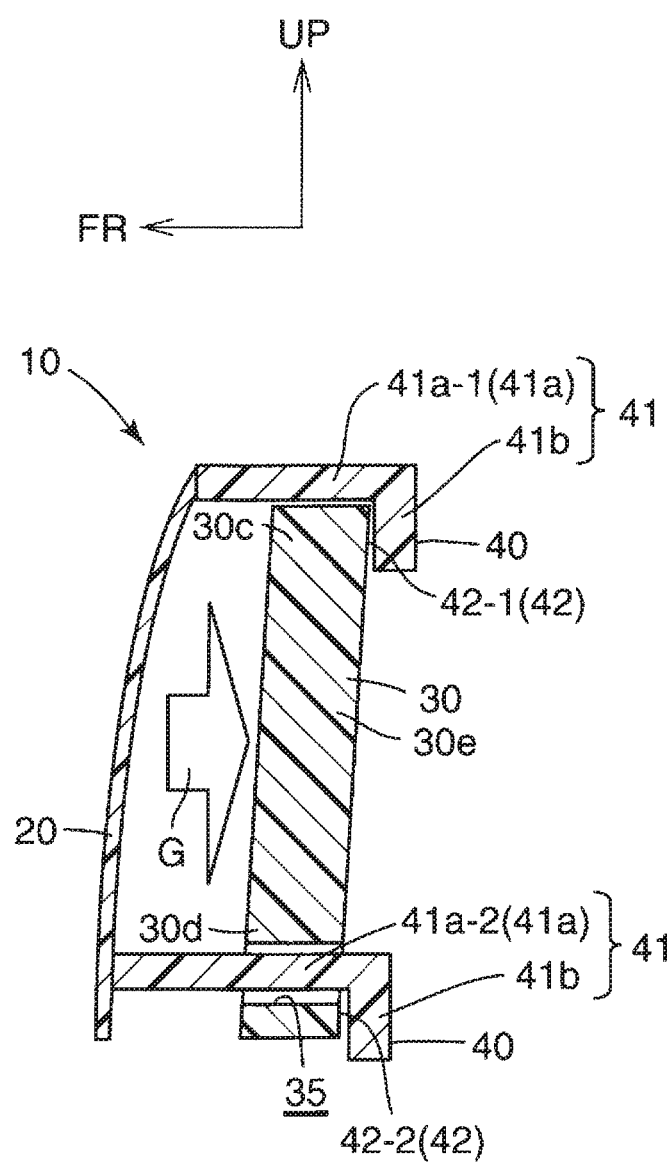
FIG. 11 is a schematic sectional view of a grille shutter attaching structure of a third embodiment of the disclosure when a wind pressure during the travel of the vehicle is applied to a grille shutter from the vehicle front side at the normal time.
Figure 12:
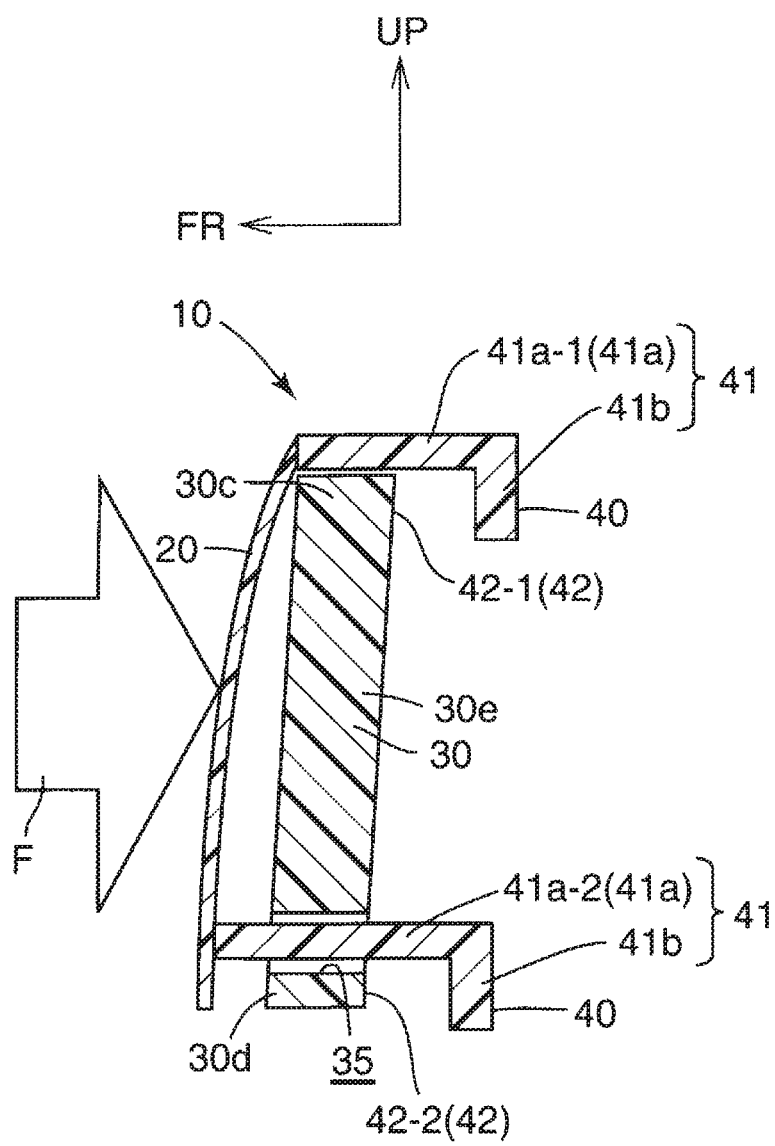
FIG. 12 is a schematic sectional view of the grille shutter attaching structure of the third embodiment of the disclosure when a collision load is applied to a radiator grille from the vehicle front side.
Figure 13:
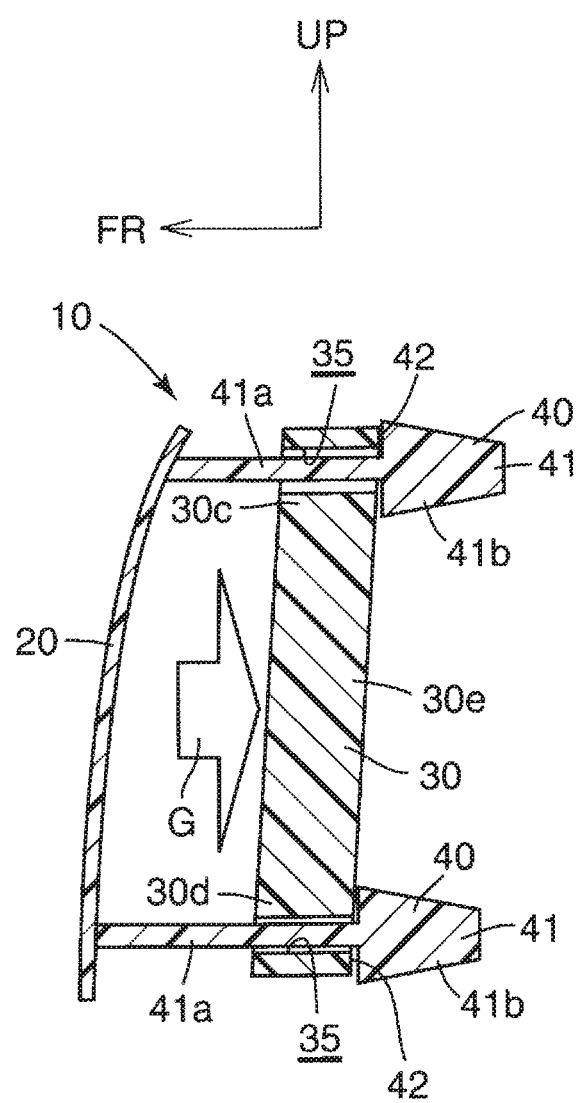
FIG. 13 is a schematic sectional view of a grille shutter attaching structure of a fourth embodiment of the disclosure when a wind pressure during the travel of the vehicle is applied to a grille shutter from the vehicle front side at the normal time.
Figure 14:
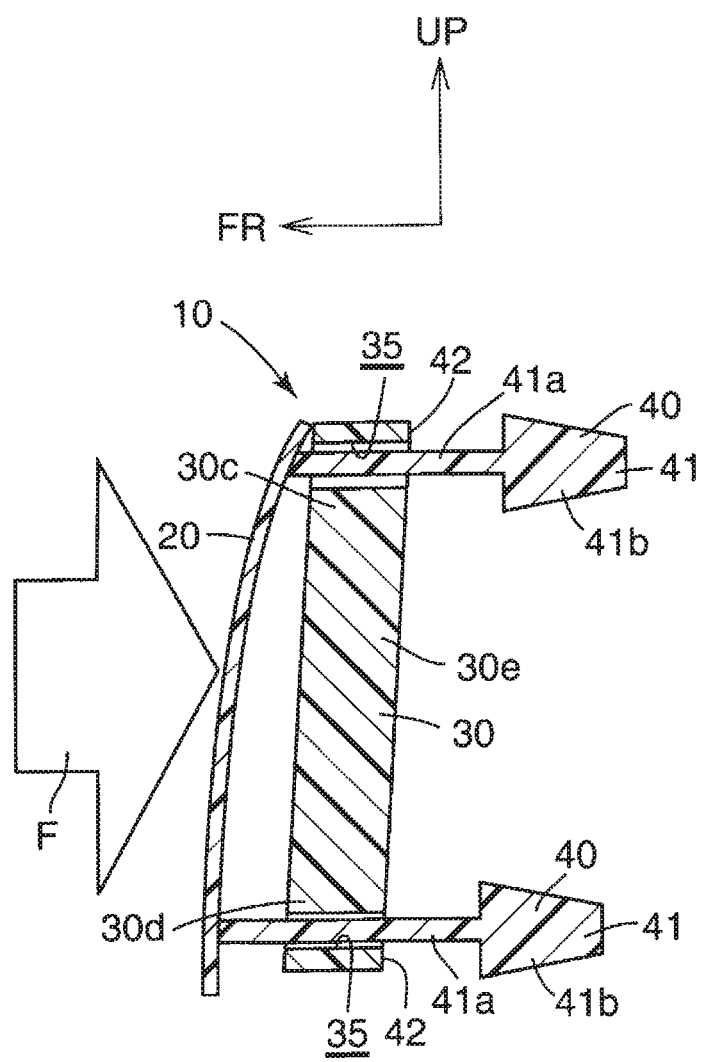
FIG. 14 is a schematic sectional view of the grille shutter attaching structure of the fourth embodiment of the disclosure when a collision load is applied to a radiator grille from the vehicle front side.
Figure 15:
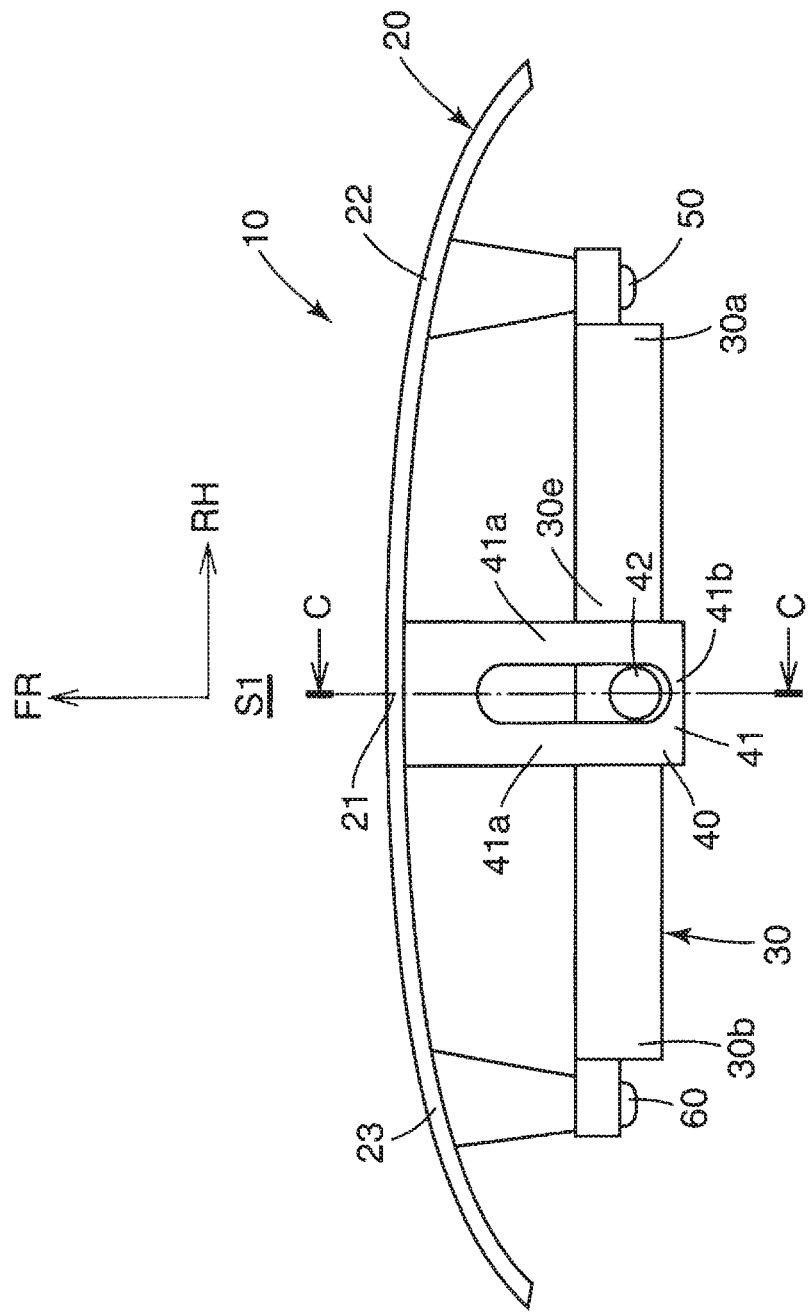
FIG. 15 is a schematic plan view of a grille shutter attaching structure of a fifth embodiment of the disclosure when a wind pressure during the travel of the vehicle is applied to a grille shutter from the vehicle front side at the normal time.
Figure 16:
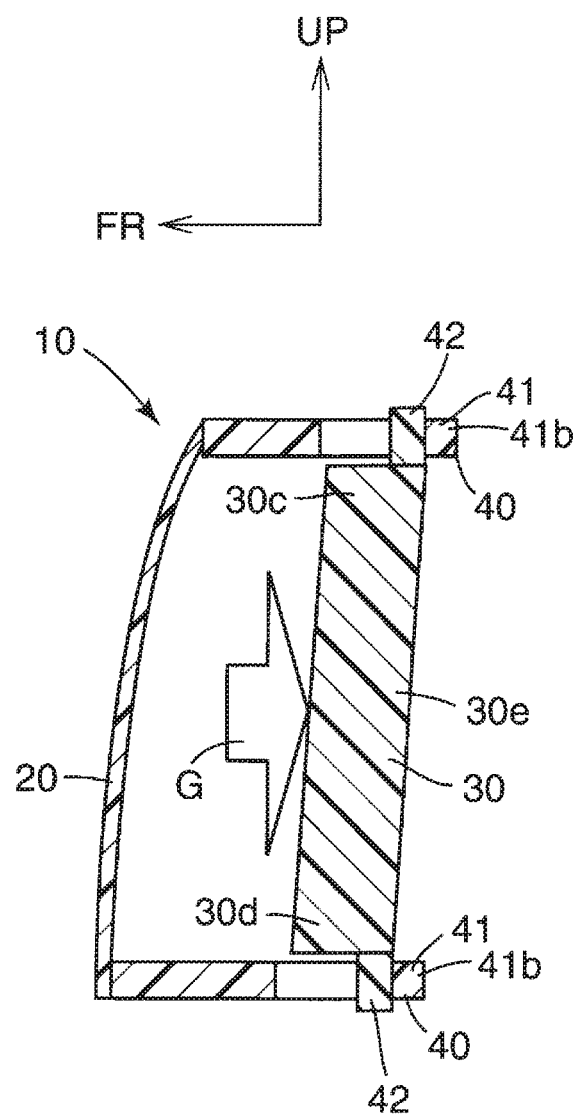
FIG. 16 is a schematic sectional view taken along the line C-C in FIG. 15.
Figure 17:
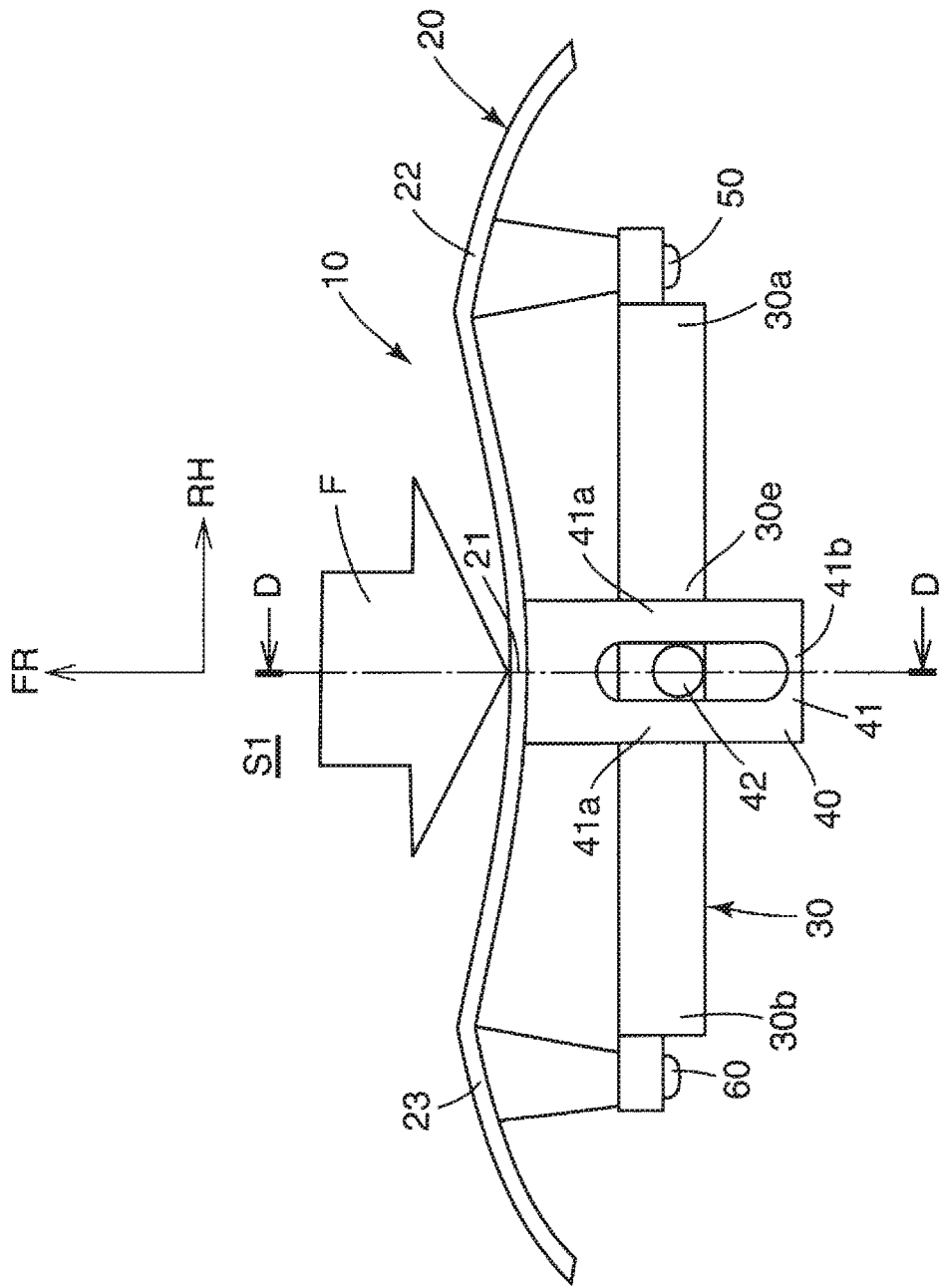
FIG. 17 is a schematic plan view of the grille shutter attaching structure of the fifth embodiment of the disclosure when a collision load is applied to a radiator grille from the vehicle front side.
Figure 18:
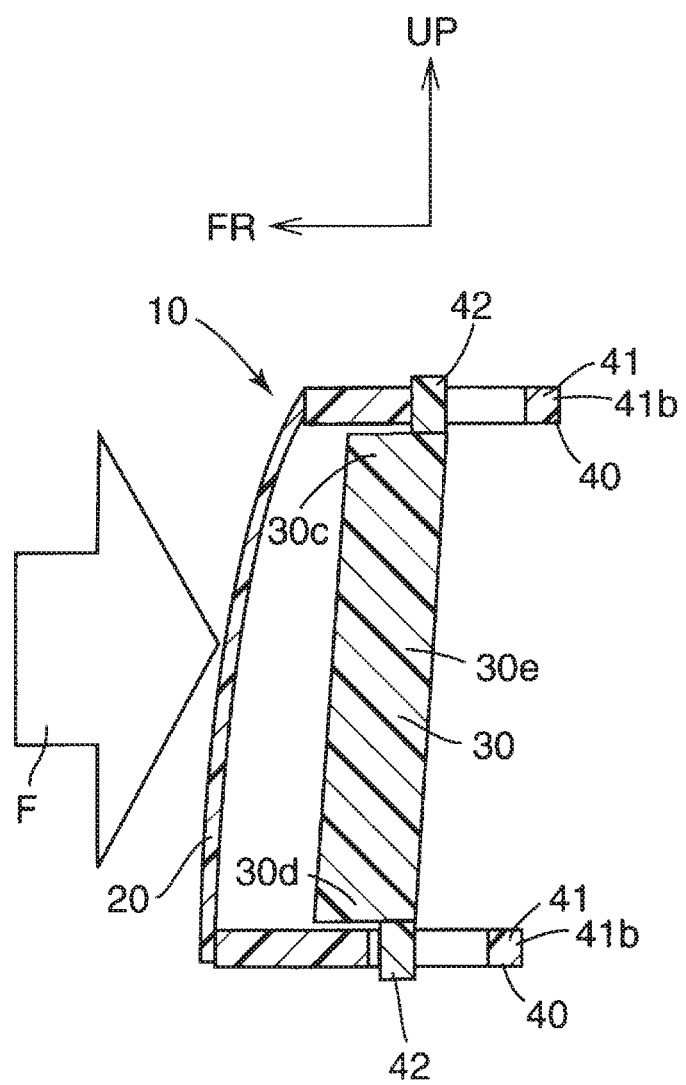
FIG. 18 is a schematic sectional view taken along the line D-D in FIG. 17.
Figure 19:
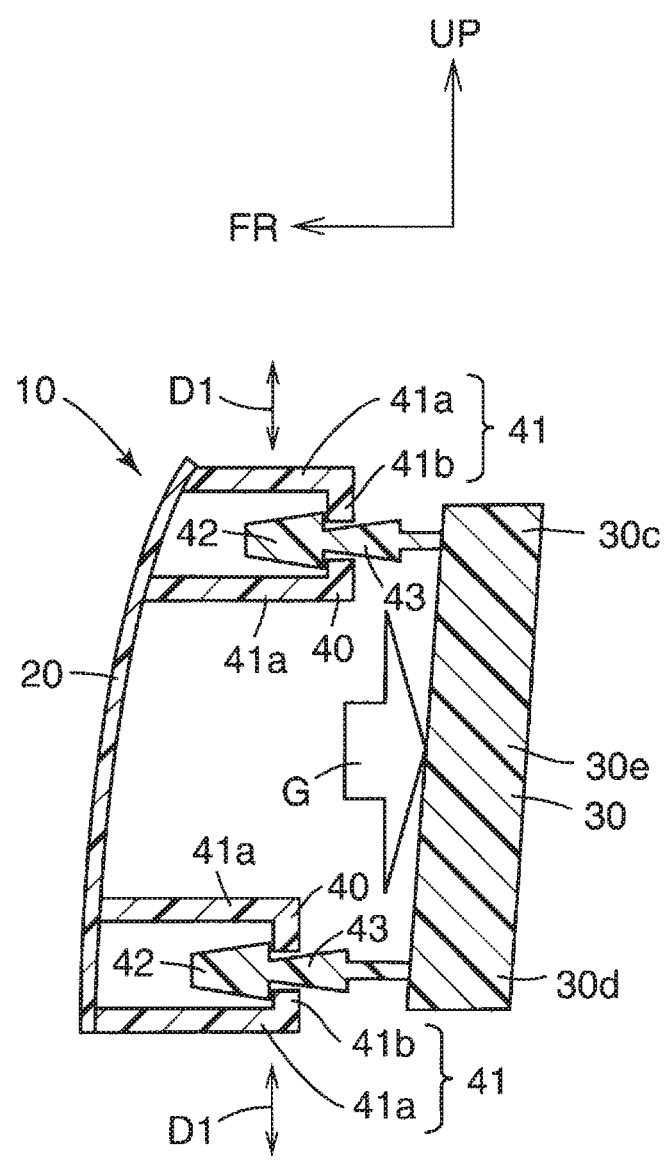
FIG. 19 is a schematic sectional view of a grille shutter attaching structure of a sixth embodiment of the disclosure when a wind pressure during the travel of the vehicle is applied to a grille shutter from the vehicle front side at the normal time.
Figure 20:
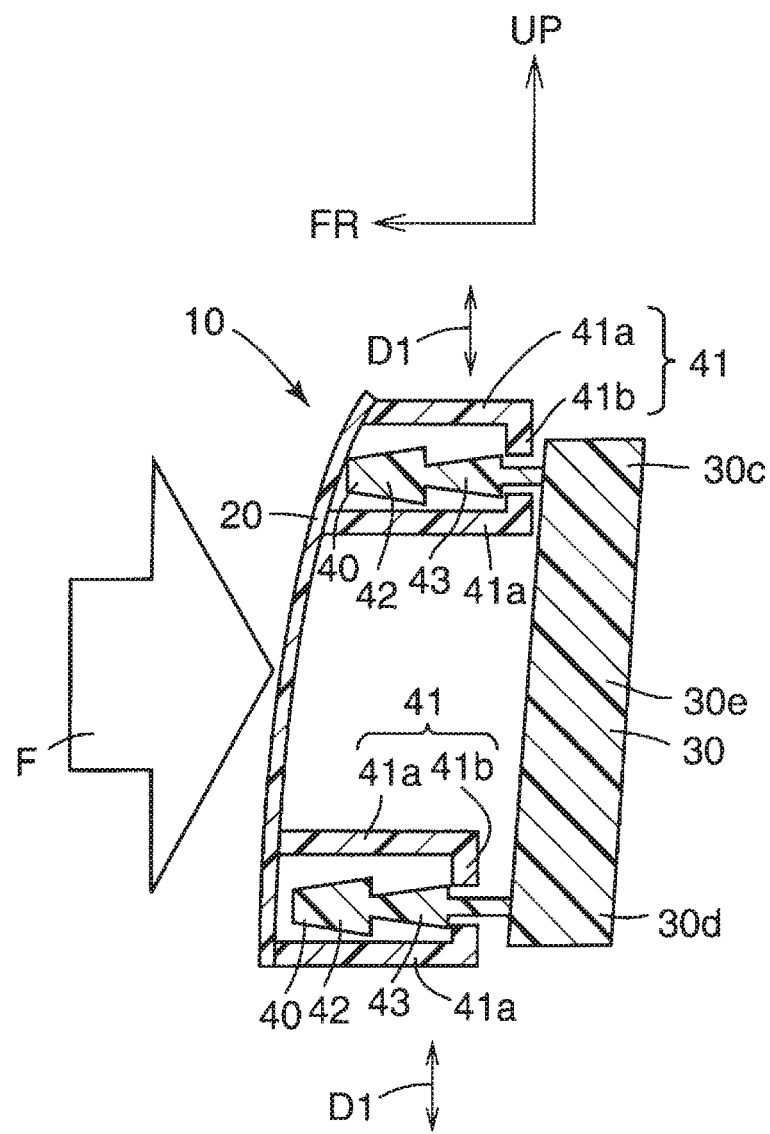
FIG. 20 is a schematic sectional view of the grille shutter attaching structure of the sixth embodiment of the disclosure when a collision load is applied to a radiator grille from the vehicle front side.
Figure 21:
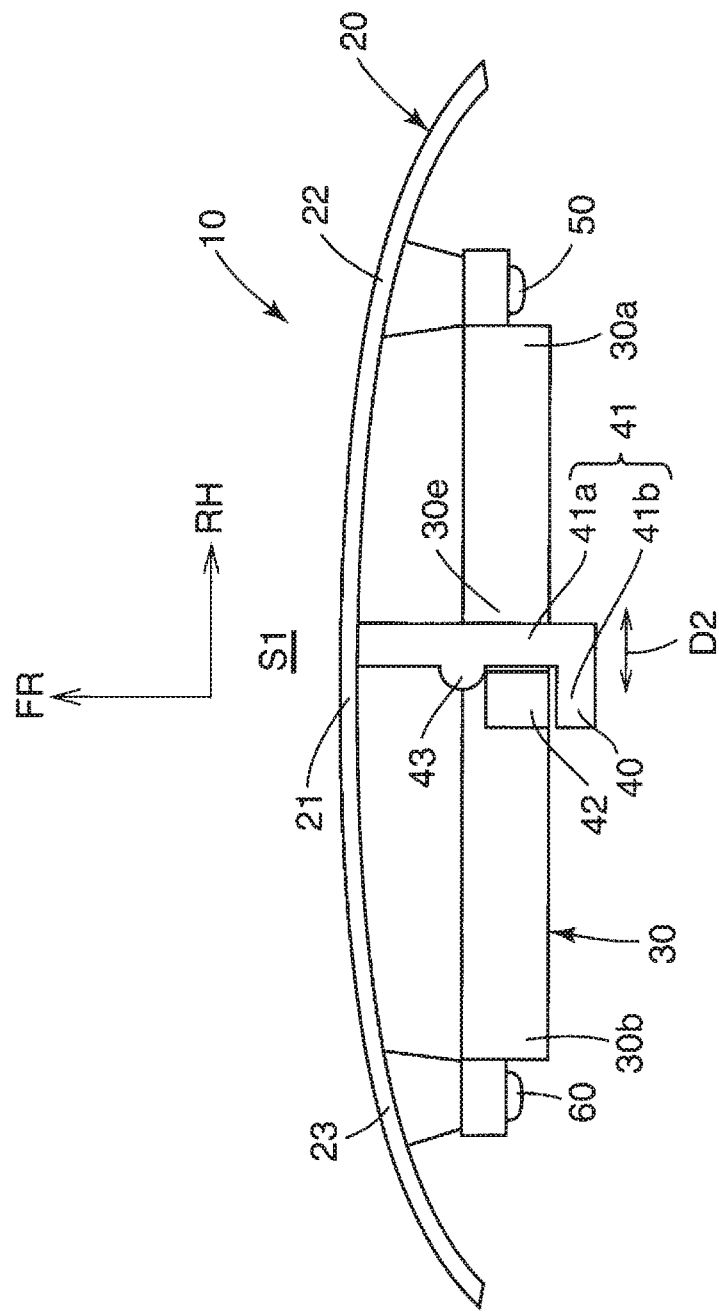
FIG. 21 is a schematic plan view of a grille shutter attaching structure of a seventh embodiment of the disclosure at the normal time.
Figure 22:
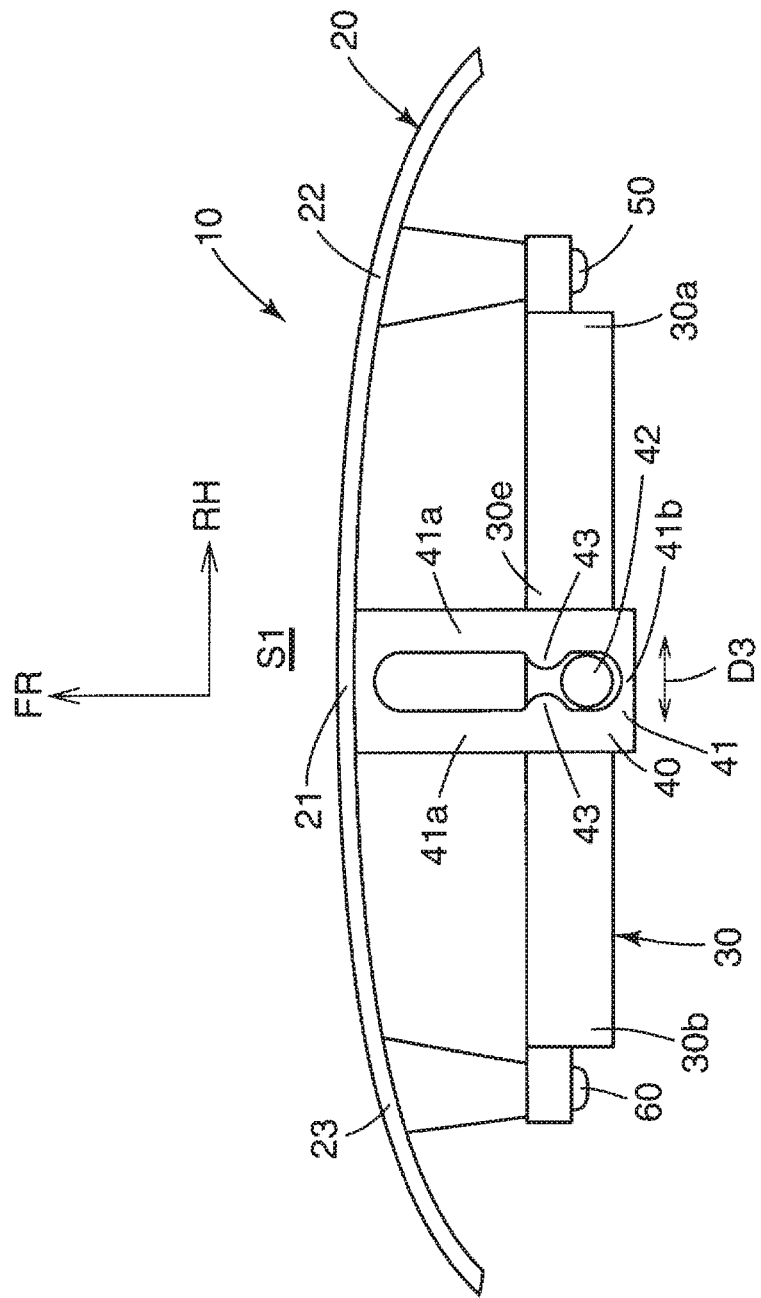
FIG. 22 is a schematic plan view of a grille shutter attaching structure of an eighth embodiment of the disclosure at the normal time.
Figure 23:
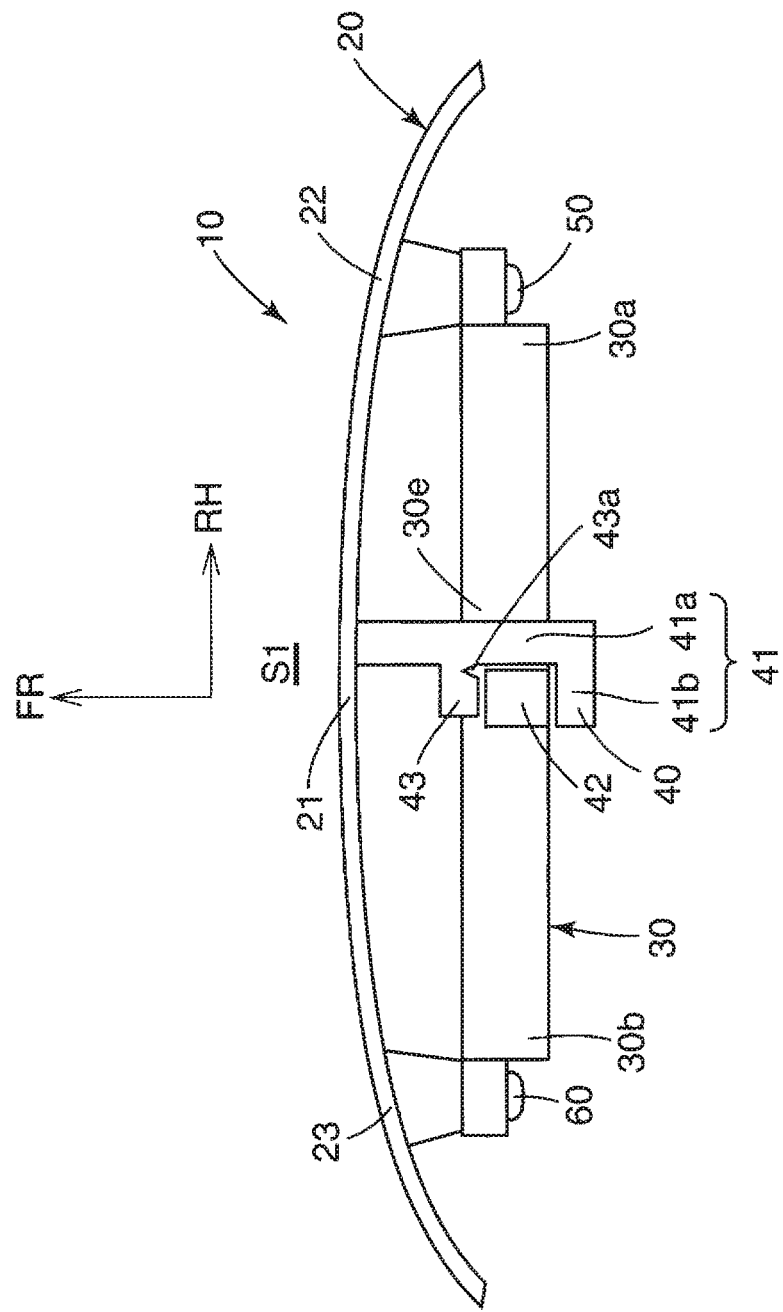
FIG. 23 is a schematic plan view of a grille shutter attaching structure of a ninth embodiment of the disclosure at the normal time.
Figure 24:
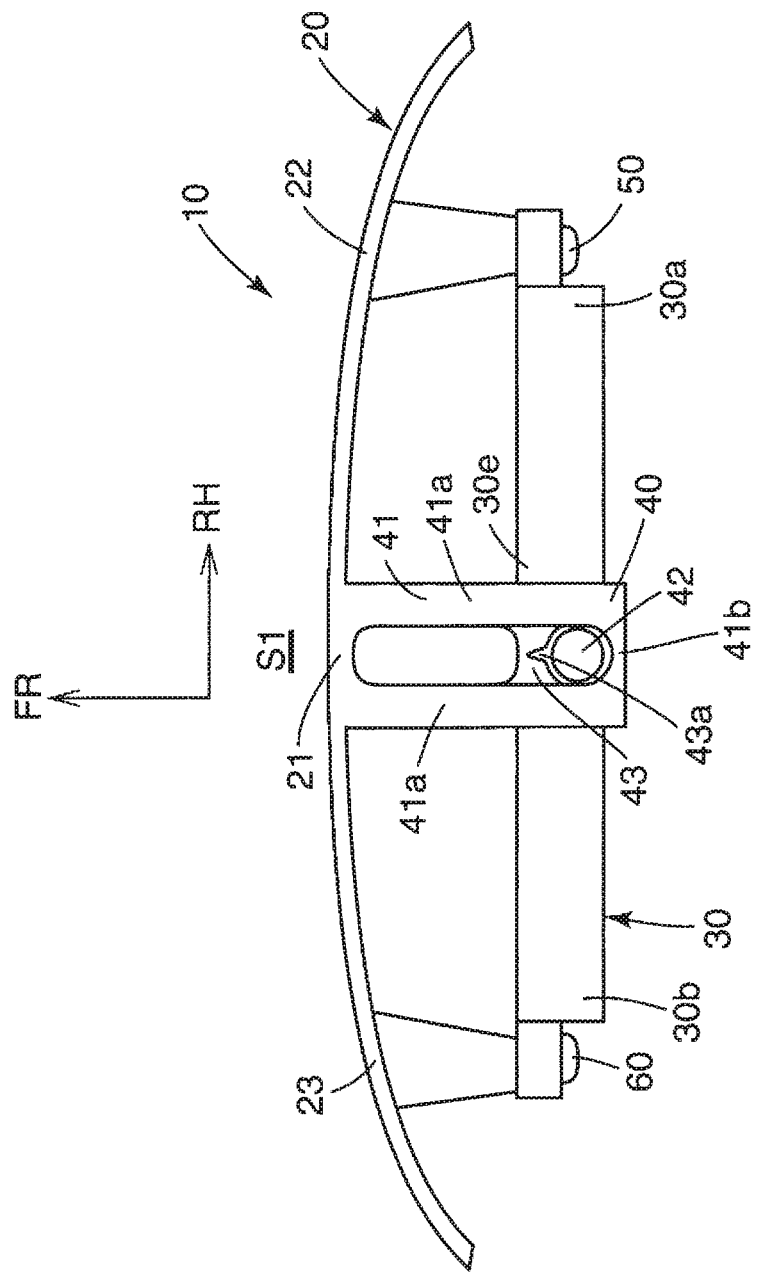
FIG. 24 is a schematic plan view of a grille shutter attaching structure of a tenth embodiment of the disclosure at the normal time.

FIGS. 1 to 8 illustrate a grille shutter attaching structure of a first embodiment of the disclosure, FIGS. 9 and 10 illustrate a grille shutter attaching structure of a second embodiment of the disclosure, FIGS. 11 and 12 illustrate a grille shutter attaching structure of a third embodiment of the disclosure, FIGS. 13 and 14 illustrate a grille shutter attaching structure of a fourth embodiment of the disclosure, FIGS. 15 to 18 illustrate a grille shutter attaching structure of a fifth embodiment of the disclosure, FIGS. 19 and 20 illustrate a grille shutter attaching structure of a sixth embodiment of the disclosure, FIG. 21 illustrates a grille shutter attaching structure of a seventh embodiment of the disclosure, FIG. 22 illustrates a grille shutter attaching structure of an eighth embodiment of the disclosure, FIG. 23 illustrates a grille shutter attaching structure of a ninth embodiment of the disclosure, and FIG. 24 illustrates a grille shutter attaching structure of a tenth embodiment of the disclosure. Portions that are common to or similar in all of the embodiments of the disclosure are assigned the same signs throughout all of the embodiments of the disclosure.

Common Matters of First to Tenth Embodiments

First, matters common to all of the embodiments (first to tenth embodiments) of the disclosure will be described.

Figure 2:
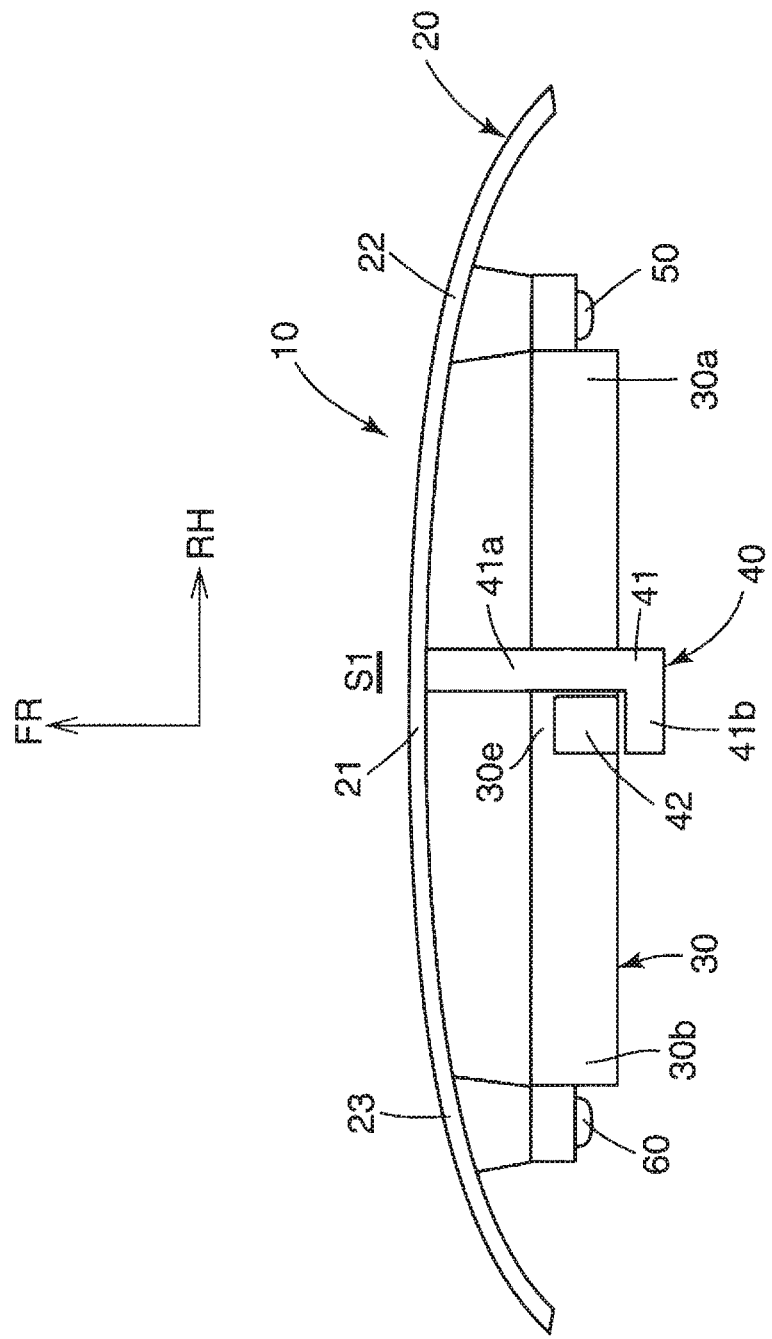
FIG. 2 is a schematic plan view of the grille shutter attaching structure of the first embodiment of the disclosure.

As illustrated in FIGS. 1 and 2, a grille shutter attaching structure 10 of the embodiment of the disclosure includes a radiator grille (may also be called a front grille) 20, a grille shutter 30, and a restriction mechanism 40.

The radiator grille 20 is provided in the front portion of a vehicle. The radiator grille 20 extends in the vehicle right-left direction. The radiator grille 20 is made of, for example, a resin. A middle portion of the radiator grille 20 in the vehicle right-left direction is located on the vehicle front side compared to both end portions of the radiator grille 20 in the vehicle right-left direction so that the radiator grille 20 has a convex curved shape that is convex toward the vehicle front side when viewed from the vehicle up-down direction.

Therefore, the radiator grille 20 has a grille frontmost portion 21 located most on the vehicle front side, a grille right portion 22 located more on the vehicle right side than the grille frontmost portion 21, and a grille left portion 23 located more on the vehicle left side than the grille frontmost portion 21. As illustrated in FIG. 1, the radiator grille 20 is provided with grille openings 24 through which traveling wind (air) can pass from an outer space 51 on the vehicle front side.

Only the single grille shutter 30 is provided. The grille shutter 30 is disposed behind the radiator grille 20 in the vehicle front-rear direction. A non-illustrated radiator for cooling an engine coolant, and a body (may also be called a vehicle body or a vehicle body frame) 100 made of a metal are disposed behind the grille shutter 30 in the vehicle front-rear direction (see FIG. 4). The traveling wind that has passed through the grille openings 24 of the radiator grille 20 from the outer space 51 on the vehicle front side flows toward the non-illustrated radiator through the grille shutter 30.

The grille shutter 30 can control the amount of traveling wind that flows to the radiator through the grille openings 24 of the radiator grille 20. The grille shutter 30 extends straight parallel to or substantially parallel to the vehicle right-left direction. As illustrated in FIG. 1, the grille shutter 30 includes a frame 31 and fins 32 movably supported by the frame 31.

The frame 31 is made of, for example, a resin. The frame 31 extends parallel to the vehicle right-left direction. The frame 31 has a frame shape that extends in the vehicle right-left direction as its longitudinal direction when viewed from the vehicle front side. The frame 31 has an upper frame portion 31a, a lower frame portion 31b, a right frame portion 31c, and a left frame portion 31d.

The upper frame portion 31a is provided in an upper end portion of the frame 31 and extends parallel to the vehicle right-left direction. The lower frame portion 31b is provided on the lower side of the upper frame portion 31a and extends parallel to the vehicle right-left direction. The lower frame portion 31b may be provided with stepped portions 31b1 such that a middle portion of the lower frame portion 31b in the vehicle right-left direction is located on the lower side compared to both end portions of the lower frame portion 31b in the vehicle right-left direction. The right frame portion 31c extends in the vehicle up-down direction and connects vehicle right side end portions (including their vicinities) of the upper frame portion 31a and the lower frame portion 31b to each other. The left frame portion 31d extends in the vehicle up-down direction and connects vehicle left side end portions (including their vicinities) of the upper frame portion 31a and the lower frame portion 31b to each other.

A link 33 is attached to the frame 31 between the right frame portion 31c and the left frame portion 31d in the vehicle right-left direction. The link 33 extends in the up-down direction between a middle portion (including its vicinity) of the upper frame portion 31a in the vehicle right-left direction and a middle portion (including its vicinity) of the lower frame portion 31b in the vehicle right-left direction.

The fins 32 are made of, for example, a resin. The fins 32 each have a plate shape and are disposed on the inner side of the frame 31. The fins 32 extend parallel to the vehicle right-left direction. End portions of the fins 32 in the vehicle right-left direction are pivotally supported by the frame 31 directly or via the link 33 so that the fins 32 are pivotable relative to the frame 31 about the pivot axes extending in the vehicle right-left direction.

The plurality of fins 32 is provided. The fins 32 are arranged in the up-down direction between the upper frame portion 31a and the lower frame portion 31b. The fins 32 are disposed between the right frame portion 31c and the link 33 and between the left frame portion 31d and the link 33.

The fins 32 are pivotable relative to the frame 31 by the power of a non-illustrated actuator that is disposed, for example, on the outer side of the right frame portion 31c or the left frame portion 31d in the vehicle right-left direction or behind the right frame portion 31c or the left frame portion 31d in the vehicle front-rear direction. It is configured that all of the fins 32 are synchronously moved by the link 33. Therefore, when all of the fins 32 are pivoted to be substantially horizontal, the grille shutter 30 is set to an open state so that traveling wind is allowed to flow to the radiator through the grille shutter 30. On the other hand, when all of the fins 32 are pivoted to be substantially vertical, the grille shutter 30 is set to a closed state so that the flow of traveling wind to the radiator through the grille shutter 30 is stopped.

The grille shutter 30 is fixedly attached to the radiator grille 20 at end portions 30a, 30b of the grille shutter 30 in the vehicle right-left direction. The end portion 30a of the grille shutter 30 on the vehicle right side is located behind the grille right portion 22 in the vehicle front-rear direction and fastened to the grille right portion 22 by bolts 50. The end portion 30a of the grille shutter 30 on the vehicle right side may be fixedly attached to the grille right portion 22 at one part thereof, but desirably is fixedly attached to the grille right portion 22 at an upper portion 30c located above the up-down direction middle of the grille shutter 30 and at a lower portion 30d located below the up-down direction middle of the grille shutter 30. This is for ensuring the fixation of the grille shutter 30 to the radiator grille 20. The end portion 30b of the grille shutter 30 on the vehicle left side is located behind the grille left portion 23 in the vehicle front-rear direction and fastened to the grille left portion 23 by bolts 60. The end portion 30b of the grille shutter 30 on the vehicle left side may be fixedly attached to the grille left portion 23 at one part thereof, but desirably is fixedly attached to the grille left portion 23 at the upper portion 30c and the lower portion 30d of the grille shutter 30 for the same reason as the end portion 30a of the grille shutter 30 on the vehicle right side.

As described above, the radiator grille 20 is curved convexly toward the vehicle front side, and the grille shutter 30 extends straight parallel to or substantially parallel to the vehicle right-left direction. Further, the end portion 30a of the grille shutter 30 on the vehicle right side is fastened to the grille right portion 22, and the end portion 30b of the grille shutter 30 on the vehicle left side is fastened to the grille left portion 23. Therefore, at the normal time when a collision load is not applied to the radiator grille 20 from the vehicle front side, the interval between the radiator grille 20 and the grille shutter 30 in the vehicle front-rear direction is the maximum at the grille frontmost portion 21 of the radiator grille 20.

The restriction mechanism 40 is a mechanism that restricts an intermediate portion 30e of the grille shutter 30 in the vehicle right-left direction from moving toward the vehicle rear side relative to the radiator grille 20. As illustrated in FIG. 2, the restriction mechanism 40 includes a restriction member 41 provided to the radiator grille 20, and a restriction member abutting portion 42 provided to the intermediate portion 30e of the grille shutter 30 in the vehicle right-left direction and configured to be abuttable against the restriction member 41 from the vehicle front side. The restriction mechanism 40 restricts the movement of the restriction member abutting portion 42 toward the vehicle rear side by the restriction member 41, thereby restricting the movement of the intermediate portion 30e of the grille shutter 30 toward the vehicle rear side relative to the radiator grille 20.

The restriction member 41 may be formed integrally with the radiator grille 20 or may be formed separately and then fixedly attached to the radiator grille 20. The restriction member 41 has an arm portion 41a extending from the radiator grille 20 toward the vehicle rear side, and a stopper portion 41b provided to the arm portion 41a at a leading end portion of the arm portion 41a in its extending direction and extending to behind the restriction member abutting portion 42 in the vehicle front-rear direction.

The restriction member 41 can take various shapes. For example, (a) the restriction member 41 may be formed into an L-shape (including a generally L-shape) with a single arm portion 41a and a stopper portion 41b bent and extending from an extending direction leading end portion of the single arm portion 41a (first, second, third, seventh, and ninth embodiments), (b) the restriction member 41 may be formed into a T-shape (including a generally T-shape) with a single arm portion 41a and a stopper portion 41b provided to an extending direction leading end portion of the single arm portion 41a and having a greater diameter than the arm portion 41a (fourth embodiment), and (c) the restriction member 41 may be formed into a U-shape (including a generally U-shape) with two arm portions 41a and a stopper portion 41b extending to make the interval between extending direction leading end portions of the two arm portions 41a zero or small (fifth, sixth, eighth, and tenth embodiments).

The arm portion 41a of the restriction member 41 may be provided to pass through the outer side of the grille shutter 30 (FIG. 9), or may be provided to pass through an arm hole 35 formed in the grille shutter 30 (FIG. 11).

Figure 6:
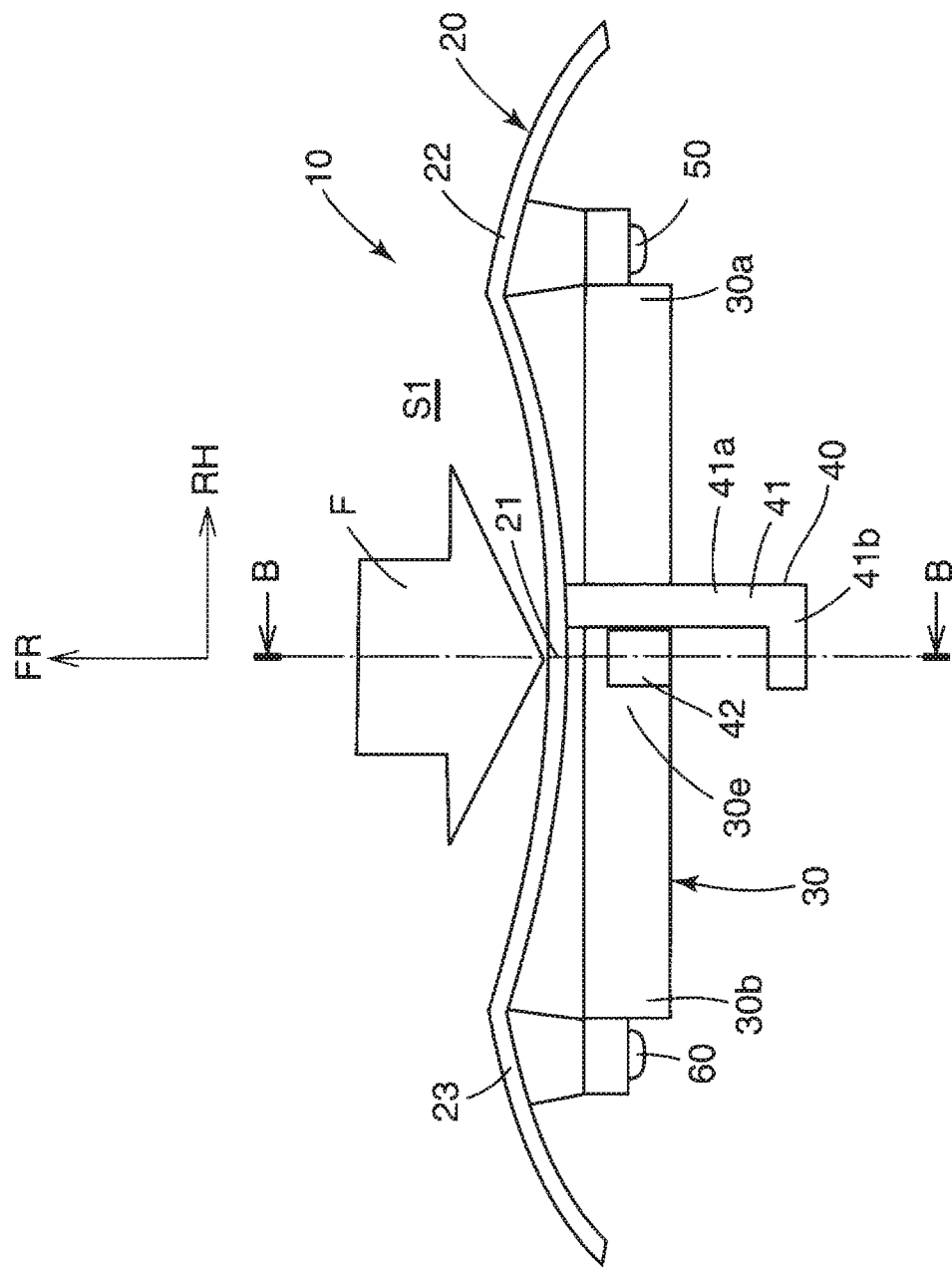
FIG. 6 is a schematic plan view of the grille shutter attaching structure of the first embodiment of the disclosure when a collision load is applied to a radiator grille from the vehicle front side.

As illustrated in FIGS. 2 and 6, the restriction member 41 (particularly the stopper portion 41b) is configured to be movable toward the vehicle rear side relative to the restriction member abutting portion 42. In the case where there is a possibility that the restriction member abutting portion 42 comes in contact with the radiator grille 20 or the restriction member 41 (particularly the arm portion 41a) to impede the movement of the restriction member 41 toward the vehicle rear side when the restriction member 41 is moved toward the vehicle rear side relative to the restriction member abutting portion 42, it is desirable that in order to suppress this possibility of impediment, as illustrated in FIG. 8, a space portion (may also be called a groove or a slide groove) 70 for avoiding the interference with the restriction member abutting portion 42 be provided to the radiator grille 20 and/or the restriction member 41 at a part located forward of the restriction member abutting portion 42 in the vehicle front-rear direction. The space portion 70 is provided by, for example, forming a recess portion, recessed toward the vehicle front side, in the radiator grille 20 and/or the restriction member 41.

The restriction member abutting portion 42 is configured to be abuttable against the stopper portion 41b of the restriction member 41 from the vehicle front side. The restriction member abutting portion 42 may be formed by a part of the frame 31 of the grille shutter 30 or may be provided by protruding the restriction member abutting portion 42 from the frame 31 of the grille shutter 30 in the vehicle up-down direction, in the vehicle right-left direction, toward the vehicle front side, or the like.

Figure 3:
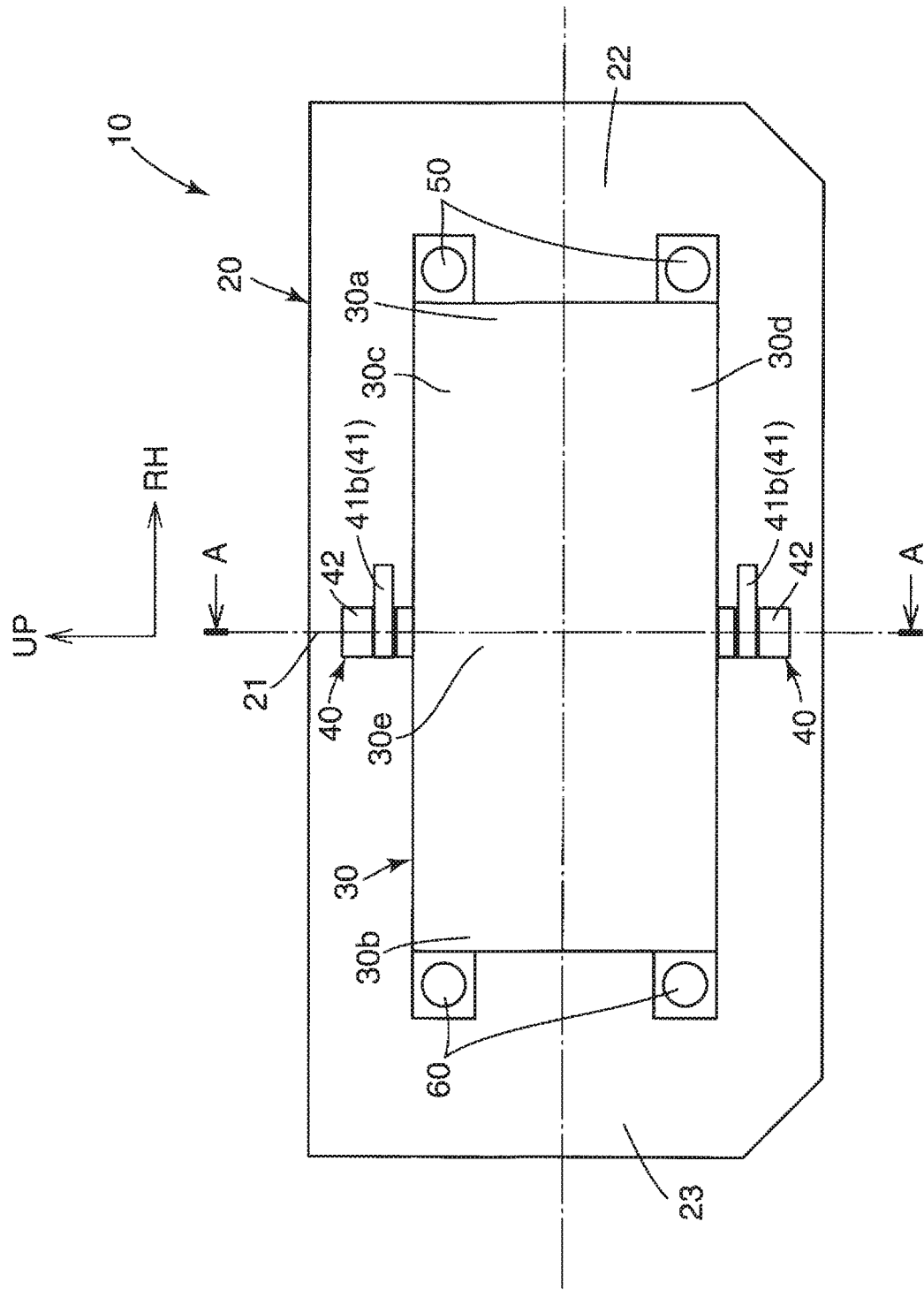
FIG. 3 is a schematic rear view of the grille shutter attaching structure of the first embodiment of the disclosure.
Figure 4:
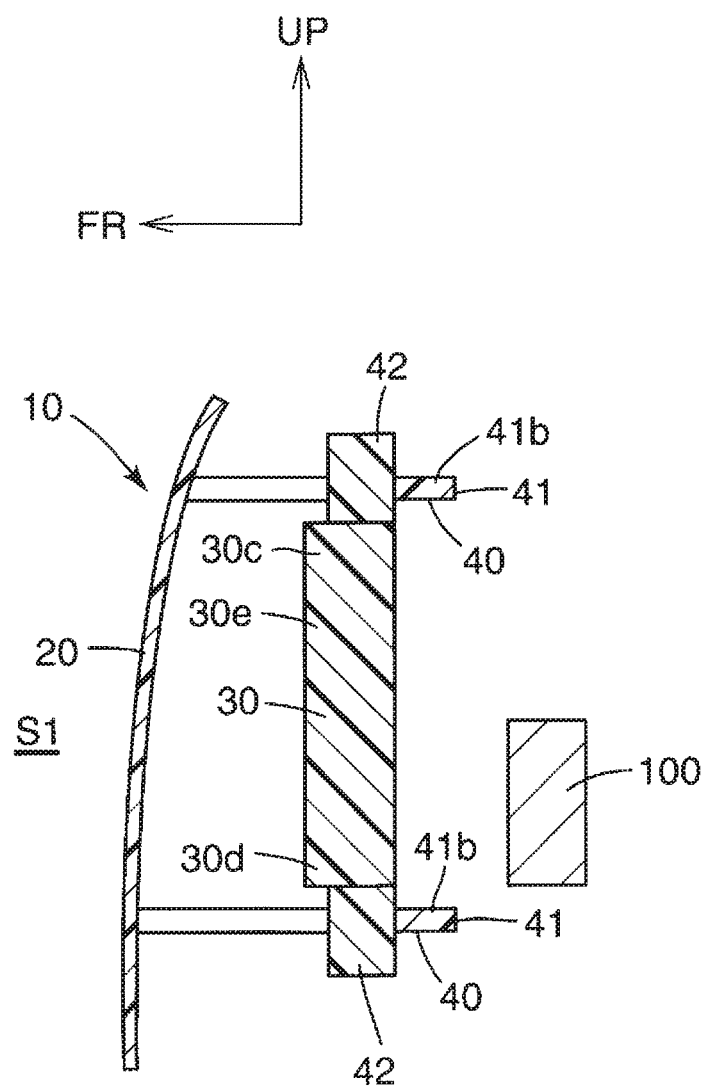
FIG. 4 is a schematic sectional view taken along the line A-A in FIG. 3.

As illustrated in FIG. 3, it is desirable that at least one restriction member abutting portion 42 be provided to the intermediate portion 30e of the grille shutter 30 at each of the upper portion 30c (e.g. upper end portion) and the lower portion 30d (e.g. lower end portion) of the grille shutter 30. This is because the deformation or movement of the intermediate portion 30e of the grille shutter 30 toward the vehicle rear side relative to the radiator grille 20 can be efficiently suppressed by the restriction mechanism 40. At least one restriction mechanism 40 may be provided corresponding to each of the upper portion 30c and the lower portion 30d of the grille shutter 30 by providing not only the restriction member abutting portion 42, but also the restriction member 41 corresponding to each of the upper portion 30c and the lower portion 30d of the grille shutter 30.

The operations and effects common to all of the embodiments (first to tenth embodiments) of the disclosure will be described.

(A) Since the grille shutter 30 is fixedly attached to the radiator grille 20 at the end portions 30a, 30b in the vehicle right-left direction, when the grille shutter 30 receives a wind pressure G (see FIG. 5) during the travel of the vehicle from the vehicle front side at the normal time when a collision load is not applied to the radiator grille 20 from the vehicle front side, the intermediate portion 30e of the grille shutter 30 in the vehicle right-left direction attempts to deform (bend) toward the vehicle rear side. If the intermediate portion 30e of the grille shutter 30 is deformed toward the vehicle rear side, it is difficult for the fins 32 to pivot relative to the frame 31, and therefore, it is necessary to take a measure to increase the size of the non-illustrated actuator for use in pivoting the fins 32, increase the number of the actuators, or the like. However, in the embodiment of the disclosure, the restriction mechanism 40 is provided that restricts the intermediate portion 30e of the grille shutter 30 in the vehicle right-left direction from moving toward the vehicle rear side relative to the radiator grille 20. Therefore, the movement of the grille shutter 30 toward the vehicle rear side can be restricted by the restriction mechanism 40. Consequently, it is possible to suppress the deformation of the grille shutter 30 at the normal time.

(B) As illustrated in FIGS. 6 and 7, when a collision load F is applied to the radiator grille 20 from the vehicle front side, such as at the time of a frontal crash test of the vehicle (e.g. when a non-illustrated impactor imitating a pedestrian hits the radiator grille 20 from the vehicle front side in the frontal crash test of the vehicle), the radiator grille 20 is deformed toward the vehicle rear side. In this event, if the restriction member 41 is not configured to be movable toward the vehicle rear side relative to the restriction member abutting portion 42, not only the restriction member 41, but also the restriction member abutting portion 42 and further the grille shutter 30 provided with the restriction member abutting portion 42 need to be deformed together toward the vehicle rear side. As a result, (i) the radiator grille 20 is difficult to deform toward the vehicle rear side. Further, (ii) when the grille shutter 30 hits the body 100 disposed behind the grille shutter 30 in the vehicle front-rear direction, further deformation of the radiator grille 20 and the grille shutter 30 toward the vehicle rear side is restricted by the body 100. However, in the embodiment of the disclosure, since the restriction member 41 is configured to be movable toward the vehicle rear side relative to the restriction member abutting portion 42, the restriction member 41 is moved along with the radiator grille 20 toward the vehicle rear side due to the deformation of the radiator grille 20 toward the vehicle rear side without being impeded by the restriction member abutting portion 42. Therefore, it is possible to suppress that the restriction member abutting portion 42 and the grille shutter 30 impede the deformation of the radiator grille 20. Consequently, the radiator grille 20 can be easily deformed toward the vehicle rear side.

(C) Since the end portion 30*a* of the grille shutter 30 on the vehicle right side is fixedly attached to the grille right portion 22 and the end portion 30*b* of the grille shutter 30 on the vehicle left side is fixedly attached to the grille left portion 23, even when the grille shutter 30 is attached to the radiator grille 20, the grille frontmost portion 21 can be moved toward the vehicle rear side without being impeded by the grille shutter 30. Therefore, it is advantageous in ensuring the deformable amount of the radiator grille 20 toward the vehicle rear side without being impeded by the grille shutter 30.

Figure 5:
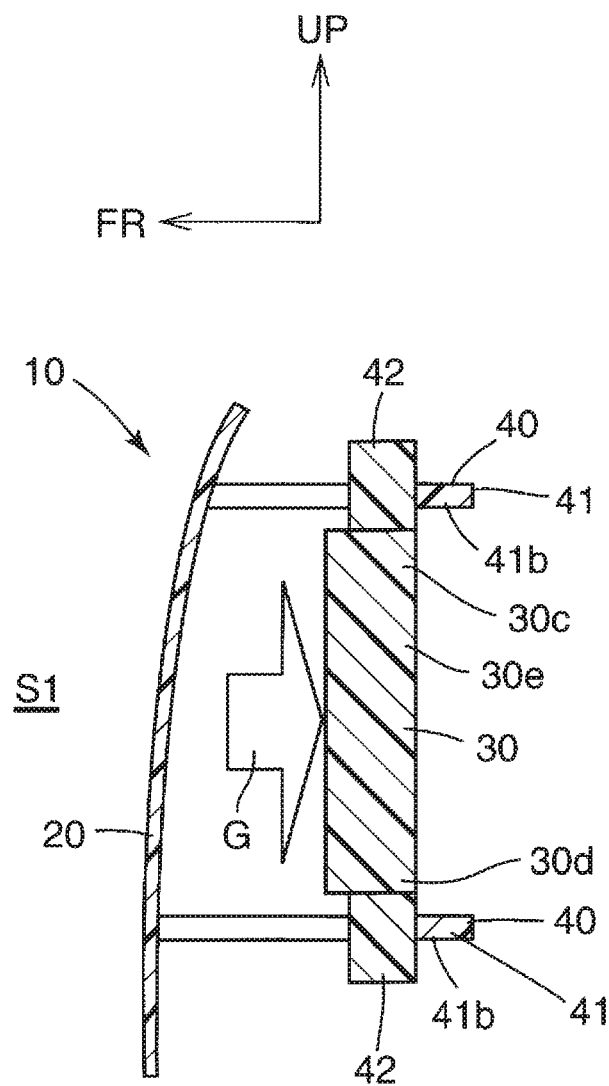
FIG. 5 is a schematic sectional view of the grille shutter attaching structure of the first embodiment of the disclosure when a wind pressure during the travel of the vehicle is applied to a grille shutter from the vehicle front side at the normal time.

(D) Since the restriction member 41 has the arm portion 41*a* extending from the radiator grille 20 toward the vehicle rear side and the stopper portion 41*b* provided to the extending direction leading end portion of the arm portion 41*a* and extending to behind the restriction member abutting portion 42 in the vehicle front-rear direction, as illustrated in FIG. 5, when the grille shutter 30 receives the wind pressure G during the travel of the vehicle from the vehicle front side at the normal time, the restriction member abutting portion 42 comes in contact with the stopper portion 41*b* of the restriction member 41 from the vehicle front side so that it is possible to restrict the intermediate portion 30*e* of the grille shutter 30 in the vehicle right-left direction from moving toward the vehicle rear side.

(E) Since the restriction member abutting portion 42 is provided to each of the upper portion 30*c* and the lower portion 30*d* of the grille shutter 30, the movement of the grille shutter 30 toward the vehicle rear side can be restricted on both upper and lower sides. Therefore, the movement of the grille shutter 30 toward the vehicle rear side can be efficiently restricted.

(F) Since the space portion 70 (see FIG. 8) for suppressing the interference with the restriction member abutting portion 42 in the vehicle front-rear direction when the restriction member 41 is moved toward the vehicle rear side relative to the restriction member abutting portion 42 is provided to the radiator grille 20 and/or the restriction member 41 at a part located forward of the restriction member abutting portion 42 in the vehicle front-rear direction, it is possible to suppress that the restriction member abutting portion 42 comes in contact with the radiator grille 20 and/or the restriction member 41 to impede the movement of the restriction member 41 toward the vehicle rear side relative to the restriction member abutting portion 42.

Common Matters of Only Sixth to Tenth Embodiments

Next, matters common to the sixth to tenth embodiments of the disclosure will be described.

In the sixth to tenth embodiments of the disclosure, the restriction mechanism 40 further includes a vibration suppressing portion 43 as illustrated in FIGS. 19 to 24. The vibration suppressing portion 43 is provided for suppressing relative vibration (relative movement) between the restriction member 41 and the restriction member abutting portion 42 in the vehicle front-rear direction at the normal time.

The vibration suppressing portion 43 is provided to one of the restriction member 41 and the restriction member abutting portion 42. At the normal time, the vibration suppressing portion 43 cooperates with the one of the restriction member 41 and the restriction member abutting portion 42 to sandwich the other one of the restriction member 41 and the restriction member abutting portion 42 therebetween in the vehicle front-rear direction, thereby suppressing the relative vibration between the restriction member 41 and the restriction member abutting portion 42 in the vehicle front-rear direction. FIG. 19 illustrates the case where the vibration suppressing portion 43 is provided to the restriction member abutting portion 42 and cooperates with the restriction member abutting portion 42 to sandwich the restriction member 41 therebetween in the vehicle front-rear direction. FIGS. 21 to 24 each illustrate the case where the vibration suppressing portion 43 is provided to the restriction member 41 and cooperates with the restriction member 41 to sandwich the restriction member abutting portion 42 therebetween in the vehicle front-rear direction. At the normal time, the vibration suppressing portion 43 may or may not be in constant contact with the restriction member 41 or the restriction member abutting portion 42 to which the vibration suppressing portion 43 is not provided.

The operations and effects common to the sixth to tenth embodiments of the disclosure will be described. (G) The restriction mechanism 40 includes the vibration suppressing portion 43, and at the normal time, the vibration suppressing portion 43 cooperates with one of the restriction member 41 and the restriction member abutting portion 42 to sandwich the other one of the restriction member 41 and the restriction member abutting portion 42 therebetween in the vehicle front-rear direction, thereby suppressing the relative vibration between the restriction member 41 and the restriction member abutting portion 42 in the vehicle front-rear direction, and therefore, compared to the case where the vibration suppressing portion 43 is not provided, it is possible to suppress the relative vibration between the restriction member 41 and the restriction member abutting portion 42 in the vehicle front-rear direction at the normal time.

Next, the portions unique to each of the embodiments of the disclosure will be described. [First Embodiment] (FIGS. 1 to 8) The first embodiment of the disclosure is configured as follows: (i) The restriction member 41 is formed into the L-shape (including the generally L-shape) with the single arm portion 41*a* and the stopper portion 41*b* bent and extending from the extending direction leading end portion of the single arm portion 41*a* in the vehicle right-left direction. (ii) The arm portion 41*a* of the restriction member 41, in its entirety, passes through the outer side of the grille shutter 30. (iii) The restriction member abutting portion 42 is provided to protrude from the grille shutter 30 in the vehicle up-down direction. (iv) The restriction mechanism 40 is not provided with the vibration suppressing portion 43.

[Second Embodiment] (FIGS. 9 and 10) The second embodiment of the disclosure is configured as follows: (i) The restriction member 41 is formed into the L-shape (including the generally L-shape) with the single arm portion 41*a* and the stopper portion 41*b* bent and extending from the extending direction leading end portion of the single arm portion 41*a* in the vehicle up-down direction. (ii) The arm portion 41*a* of the restriction member 41, in its entirety, passes through the outer side of the grille shutter 30. (iii) The restriction member abutting portion 42 is formed by a part of the grille shutter 30. (iv) The restriction mechanism 40 is not provided with the vibration suppressing portion 43.

[Third Embodiment] (FIGS. 11 and 12) The third embodiment of the disclosure is configured as follows: (i) The restriction member 41 is formed into the L-shape (including the generally L-shape) with the single arm portion 41*a* and the stopper portion 41*b* bent and extending from the extending direction leading end portion of the single arm portion

41*a* in the vehicle up-down direction. (ii) Of the arm portions 41*a* of the restriction members 41, the arm portion 41*a*-1 that comes in contact with the restriction member abutting portion 42-1 provided to the upper portion 30*c* of the grille shutter 30 passes through the outer side of the grille shutter 30, and the arm portion 41*a*-2 that comes in contact with the restriction member abutting portion 42-2 provided to the lower portion 30*d* of the grille shutter 30 passes through the arm hole 35 of the grille shutter 30. (iii) The restriction member abutting portion 42 is formed by a part of the grille shutter 30. (iv) The restriction mechanism 40 is not provided with the vibration suppressing portion 43.

[Fourth Embodiment] (FIGS. 13 and 14) The fourth embodiment of the disclosure is configured as follows: (i) The restriction member 41 is formed into the T-shape (including the generally T-shape) with the single arm portion 41*a* and the stopper portion 41*b* provided to the extending direction leading end portion of the single arm portion 41*a* and having the greater diameter than the arm portion 41*a*. (ii) The arm portion 41*a* of the restriction member 41 passes through the arm hole 35 of the grille shutter 30. (iii) The restriction member abutting portion 42 is formed by a part of the grille shutter 30. (iv) The restriction mechanism 40 is not provided with the vibration suppressing portion 43.

[Fifth Embodiment] (FIGS. 15 to 18) The fifth embodiment of the disclosure is configured as follows: (i) The restriction member 41 is formed into the U-shape (including the generally U-shape) with the two arm portions 41*a* and the stopper portion 41*b* extending to make the interval between the extending direction leading end portions of the two arm portions 41*a* zero. (ii) The arm portions 41*a* of the restriction member 41 pass through the outer side of the grille shutter 30. (iii) The restriction member abutting portion 42 is provided to protrude from the grille shutter 30 in the vehicle up-down direction. (iv) The restriction mechanism 40 is not provided with the vibration suppressing portion 43.

[Sixth Embodiment] (FIGS. 19 and 20) The sixth embodiment of the disclosure is configured as follows: (i) The restriction member 41 is formed into the U-shape (including the generally U-shape) with the two arm portions 41*a* and the stopper portion 41*b* extending to make the interval between the extending direction leading end portions of the two arm portions 41*a* small. (ii) The arm portions 41*a* of the restriction member 41 are located on the outer side of the grille shutter 30. (iii) The restriction member abutting portion 42 is provided to protrude from the grille shutter 30 toward the vehicle front side and has a protruding direction leading end portion formed to be greater in diameter. (iv) The restriction mechanism 40 includes the vibration suppressing portion 43.

The vibration suppressing portion 43 is provided to a protruding direction intermediate portion of the restriction member abutting portion 42. At the normal time, the vibration suppressing portion 43 cooperates with the restriction member abutting portion 42 to sandwich the stopper portion 41*b* of the restriction member 41 therebetween in the vehicle front-rear direction, thereby suppressing the relative vibration between the restriction member 41 and the restriction member abutting portion 42 in the vehicle front-rear direction.

Since the vibration suppressing portion 43 is provided, there is a possibility that the movement of the restriction member 41 toward the vehicle rear side relative to the restriction member abutting portion 42 is suppressed by the vibration suppressing portion 43. Therefore, as illustrated in FIG. 20, it is configured that when the restriction member 41 is moved toward the vehicle rear side relative to the restriction member abutting portion 42, the restriction member 41 is pushed by the vibration suppressing portion 43 to be elastically deformed in a direction D1 perpendicular to the vehicle front-rear direction so that the restriction member 41 can get over the vibration suppressing portion 43.

In the sixth embodiment of the disclosure, the following unique operations and effects can be obtained. (H1) When the restriction member 41 is moved toward the vehicle rear side relative to the restriction member abutting portion 42, the restriction member 41 is elastically deformed in the direction D1 perpendicular to the vehicle front-rear direction so that the restriction member 41 can get over the vibration suppressing portion 43. Therefore, even when the vibration suppressing portion 43 is provided, the restriction member 41 can be moved toward the vehicle rear side relative to the restriction member abutting portion 42.

[Seventh Embodiment] (FIG. 21) The seventh embodiment of the disclosure is configured as follows: (i) The restriction member 41 is formed into the L-shape (including the generally L-shape) with the single arm portion 41*a* and the stopper portion 41*b* bent and extending from the extending direction leading end portion of the single arm portion 41*a* in the vehicle right-left direction. (ii) The arm portion 41*a* of the restriction member 41 passes through the outer side of the grille shutter 30. (iii) The restriction member abutting portion 42 is provided to protrude from the grille shutter 30 in the vehicle up-down direction. (iv) The restriction mechanism 40 includes the vibration suppressing portion 43.

The vibration suppressing portion 43 is provided to an extending direction intermediate portion of the arm portion 41*a* of the restriction member 41. At the normal time, the vibration suppressing portion 43 cooperates with the stopper portion 41*b* of the restriction member 41 to sandwich the restriction member abutting portion 42 therebetween in the vehicle front-rear direction, thereby suppressing the relative vibration between the restriction member 41 and the restriction member abutting portion 42 in the vehicle front-rear direction.

Since the vibration suppressing portion 43 is provided, there is a possibility that the movement of the restriction member 41 toward the vehicle rear side relative to the restriction member abutting portion 42 is suppressed by the vibration suppressing portion 43. Therefore, it is configured that when the restriction member 41 is moved toward the vehicle rear side relative to the restriction member abutting portion 42, the arm portion 41*a* of the restriction member 41 and/or the restriction member abutting portion 42 is elastically deformed in a direction D2 perpendicular to the vehicle front-rear direction so that the restriction member abutting portion 42 can get over the vibration suppressing portion 43.

In the seventh embodiment of the disclosure, the following unique operations and effects can be obtained. (H2) When the restriction member 41 is moved toward the vehicle rear side relative to the restriction member abutting portion 42, the restriction member 41 and/or the restriction member abutting portion 42 is elastically deformed in the direction D2 perpendicular to the vehicle front-rear direction so that the restriction member abutting portion 42 can get over the vibration suppressing portion 43. Therefore, even when the vibration suppressing portion 43 is provided, the restriction member 41 can be moved toward the vehicle rear side relative to the restriction member abutting portion 42.

[Eighth Embodiment] (FIG. 22) The eighth embodiment of the disclosure is configured as follows: (i) The restriction member 41 is formed into the U-shape (including the generally U-shape) with the two arm portions 41a and the stopper portion 41b extending to make the interval between the extending direction leading end portions of the two arm portions 41a zero. (ii) The arm portions 41a of the restriction member 41 pass through the outer side of the grille shutter 30. (iii) The restriction member abutting portion 42 is provided to protrude from the grille shutter 30 in the vehicle up-down direction. (iv) The restriction mechanism 40 includes the vibration suppressing portion 43.

The vibration suppressing portion 43 is provided to extending direction intermediate portions of the arm portions 41a of the restriction member 41. At the normal time, the vibration suppressing portion 43 cooperates with the stopper portion 41b of the restriction member 41 to sandwich the restriction member abutting portion 42 therebetween in the vehicle front-rear direction, thereby suppressing the relative vibration between the restriction member 41 and the restriction member abutting portion 42 in the vehicle front-rear direction.

Since the vibration suppressing portion 43 is provided, there is a possibility that the movement of the restriction member 41 toward the vehicle rear side relative to the restriction member abutting portion 42 is suppressed by the vibration suppressing portion 43. Therefore, it is configured that when the restriction member 41 is moved toward the vehicle rear side relative to the restriction member abutting portion 42, the arm portions 41a of the restriction member 41 and/or the restriction member abutting portion 42 is elastically deformed in a direction D3 perpendicular to the vehicle front-rear direction so that the restriction member abutting portion 42 can get over the vibration suppressing portion 43.

In the eighth embodiment of the disclosure, the following unique operations and effects can be obtained. (H3) When the restriction member 41 is moved toward the vehicle rear side relative to the restriction member abutting portion 42, the restriction member 41 and/or the restriction member abutting portion 42 is elastically deformed in the direction D3 perpendicular to the vehicle front-rear direction so that the restriction member abutting portion 42 can get over the vibration suppressing portion 43. Therefore, even when the vibration suppressing portion 43 is provided, the restriction member 41 can be moved toward the vehicle rear side relative to the restriction member abutting portion 42.

[Ninth Embodiment] (FIG. 23) The ninth embodiment of the disclosure is configured as follows: (i) The restriction member 41 is formed into the L-shape (including the generally L-shape) with the single arm portion 41a and the stopper portion 41b bent and extending from the extending direction leading end portion of the single arm portion 41a in the vehicle right-left direction. (ii) The arm portion 41a of the restriction member 41 passes through the outer side of the grille shutter 30. (iii) The restriction member abutting portion 42 is provided to protrude from the grille shutter 30 in the vehicle up-down direction. (iv) The restriction mechanism 40 includes the vibration suppressing portion 43.

The vibration suppressing portion 43 is provided to an extending direction intermediate portion of the arm portion 41a of the restriction member 41. At the normal time, the vibration suppressing portion 43 cooperates with the stopper portion 41b of the restriction member 41 to sandwich the restriction member abutting portion 42 therebetween in the vehicle front-rear direction, thereby suppressing the relative vibration between the restriction member 41 and the restriction member abutting portion 42 in the vehicle front-rear direction.

Since the vibration suppressing portion 43 is provided, there is a possibility that the movement of the restriction member 41 toward the vehicle rear side relative to the restriction member abutting portion 42 is suppressed by the vibration suppressing portion 43. Therefore, it is configured that when the restriction member 41 is moved toward the vehicle rear side relative to the restriction member abutting portion 42, the vibration suppressing portion 43 is pushed by the restriction member abutting portion 42 to be plastically deformed (broken). In order to facilitate the plastic deformation of the vibration suppressing portion 43, the vibration suppressing portion 43 may be formed to have a minimum thickness in the restriction mechanism 40 or may be provided with a notch 43a.

In the ninth embodiment of the disclosure, the following unique operations and effects can be obtained. (H4) When the restriction member 41 is moved toward the vehicle rear side relative to the restriction member abutting portion 42, the vibration suppressing portion 43 is pushed by the restriction member abutting portion 42 to be plastically deformed (broken). Therefore, even when the vibration suppressing portion 43 is provided, the restriction member 41 can be moved toward the vehicle rear side relative to the restriction member abutting portion 42.

[Tenth Embodiment] (FIG. 24) The tenth embodiment of the disclosure is configured as follows: (i) The restriction member 41 is formed into the U-shape (including the generally U-shape) with the two arm portions 41a and the stopper portion 41b extending to make the interval between the extending direction leading end portions of the two arm portions 41a zero. (ii) The arm portions 41a of the restriction member 41 pass through the outer side of the grille shutter 30. (iii) The restriction member abutting portion 42 is provided to protrude from the grille shutter 30 in the vehicle up-down direction. (iv) The restriction mechanism 40 includes the vibration suppressing portion 43.

The vibration suppressing portion 43 is provided to extending direction intermediate portions of the arm portions 41a of the restriction member 41. At the normal time, the vibration suppressing portion 43 cooperates with the stopper portion 41b of the restriction member 41 to sandwich the restriction member abutting portion 42 therebetween in the vehicle front-rear direction, thereby suppressing the relative vibration between the restriction member 41 and the restriction member abutting portion 42 in the vehicle front-rear direction.

Since the vibration suppressing portion 43 is provided, there is a possibility that the movement of the restriction member 41 toward the vehicle rear side relative to the restriction member abutting portion 42 is suppressed by the vibration suppressing portion 43. Therefore, it is configured that when the restriction member 41 is moved toward the vehicle rear side relative to the restriction member abutting portion 42, the vibration suppressing portion 43 is pushed by the restriction member abutting portion 42 to be plastically deformed (broken). In order to facilitate the plastic deformation of the vibration suppressing portion 43, the vibration suppressing portion 43 may be formed to have a minimum thickness in the restriction mechanism 40 or may be provided with a notch 43a.

In the tenth embodiment of the disclosure, the following unique operations and effects can be obtained. (H5) When the restriction member 41 is moved toward the vehicle rear side relative to the restriction member abutting portion 42, the vibration suppressing portion 43 is pushed by the restriction member abutting portion 42 to be plastically deformed (broken). Therefore, even when the vibration suppressing portion 43 is provided, the restriction member 41 can be moved toward the vehicle rear side relative to the restriction member abutting portion 42.

What is claimed is:

1. A grille shutter attaching structure comprising:
a radiator grille;
a grille shutter; and
a restriction mechanism, wherein:
the grille shutter is disposed behind the radiator grille in a vehicle front-rear direction and fixedly attached to the radiator grille at end portions of the grille shutter in a vehicle right-left direction;
the restriction mechanism includes a restriction member attached to the radiator grille and a restriction member abutting portion attached to an intermediate portion of the grille shutter in the vehicle right-left direction and configured to be abuttable against the restriction member from a vehicle front side, the restriction mechanism configured to restrict the intermediate portion of the grille shutter in the vehicle right-left direction from moving toward a vehicle rear side relative to the radiator grille; and
the restriction member is configured to be movable toward the vehicle rear side relative to the restriction member abutting portion.

2. The grille shutter attaching structure according to claim 1, wherein the restriction mechanism is configured such that when a collision load is not applied to the radiator grille from the vehicle front side, the restriction member abutting portion comes in contact with the restriction member to restrict the intermediate portion of the grille shutter in the vehicle right-left direction from moving toward the vehicle rear side relative to the radiator grille, and that when the collision load is applied to the radiator grille from the vehicle front side to deform the radiator grille toward the vehicle rear side, the restriction member is moved toward the vehicle rear side relative to the restriction member abutting portion.

3. The grille shutter attaching structure according to claim 1, wherein:
the radiator grille has a convex curved shape being convex toward the vehicle front side when viewed from a vehicle up-down direction, the radiator grille including a grille frontmost portion located most on the vehicle front side, a grille right portion located more on a vehicle right side than the grille frontmost portion, and a grille left portion located more on a vehicle left side than the grille frontmost portion; and
the end portion of the grille shutter on the vehicle right side is located behind the grille right portion in the vehicle front-rear direction and fixedly attached to the grille right portion, and the end portion of the grille shutter on the vehicle left side is located behind the grille left portion in the vehicle front-rear direction and fixedly attached to the grille left portion.

4. The grille shutter attaching structure according to claim 1, wherein the restriction member includes an arm portion extending from the radiator grille toward the vehicle rear side, and a stopper portion provided to an extending direction leading end portion of the arm portion and extending to behind the restriction member abutting portion in the vehicle front-rear direction.

5. The grille shutter attaching structure according to claim 1, wherein the restriction member abutting portion is provided to the intermediate portion of the grille shutter in the vehicle right-left direction at each of an upper portion and a lower portion of the grille shutter.

6. The grille shutter attaching structure according to claim 1, wherein a space portion is provided to the radiator grille and/or the restriction member at a part located forward of the restriction member abutting portion in the vehicle front-rear direction, the space portion configured to suppress an interference with the restriction member abutting portion in the vehicle front-rear direction when the restriction member is moved toward the vehicle rear side relative to the restriction member abutting portion.

7. The grille shutter attaching structure according to claim 1, wherein:
the restriction mechanism further includes a vibration suppressing portion; and when a collision load is not applied to the radiator grille from the vehicle front side, the vibration suppressing portion is configured to suppress relative vibration between the restriction member and the restriction member abutting portion in the vehicle front-rear direction by cooperating with one of the restriction member and the restriction member abutting portion to sandwich the other one of the restriction member and the restriction member abutting portion in the vehicle front-rear direction.

8. The grille shutter attaching structure according to claim 7, wherein when the restriction member is moved toward the vehicle rear side relative to the restriction member abutting portion, the restriction member and/or the restriction member abutting portion is configured to be elastically deformed in a direction perpendicular to the vehicle front-rear direction to allow the other one of the restriction member and the restriction member abutting portion to get over the vibration suppressing portion.

9. The grille shutter attaching structure according to claim 7, wherein when the restriction member is moved toward the vehicle rear side relative to the restriction member abutting portion, the vibration suppressing portion is configured to be pushed by the other one of the restriction member and the restriction member abutting portion to be plastically deformed.

* * * * *